US012326624B2

(12) United States Patent
Okuyama et al.

(10) Patent No.: US 12,326,624 B2
(45) Date of Patent: Jun. 10, 2025

(54) DISPLAY DEVICE

(71) Applicant: Japan Display Inc., Tokyo (JP)

(72) Inventors: Kentaro Okuyama, Tokyo (JP); Naoyuki Asano, Tokyo (JP); Kazuki Ichihara, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/673,386

(22) Filed: May 24, 2024

(65) Prior Publication Data

US 2024/0402527 A1 Dec. 5, 2024

(30) Foreign Application Priority Data

May 29, 2023 (JP) ................................. 2023-088019

(51) Int. Cl.
*G02F 1/1333* (2006.01)
*G02F 1/1335* (2006.01)

(52) U.S. Cl.
CPC .. *G02F 1/133331* (2021.01); *G02F 1/133553* (2013.01); *G02F 1/133607* (2021.01)

(58) Field of Classification Search
CPC ............. G02F 1/1335; G02F 1/133331; G02F 1/133607; G02F 1/133553
See application file for complete search history.

(56) References Cited

U.S. PATENT DOCUMENTS

| | | | | |
|---|---|---|---|---|
| 2017/0269439 A1* | 9/2017 | Hyodo | ............... | G02F 1/136227 |
| 2018/0011350 A1* | 1/2018 | Jia | ............... | H01L 21/68 |
| 2019/0018275 A1* | 1/2019 | Ochi | ............... | G06F 1/1637 |
| 2019/0137680 A1* | 5/2019 | Kuge | ............... | F21K 9/61 |
| 2019/0302496 A1 | 10/2019 | Okuyama | | |
| 2021/0080778 A1* | 3/2021 | Hatano | ............... | C03C 15/00 |
| 2022/0026750 A1* | 1/2022 | Numata | ............ | G02F 1/133512 |
| 2022/0365398 A1* | 11/2022 | Nakamura | ........ | G02F 1/133616 |
| 2023/0280609 A1* | 9/2023 | Ichihara | ............ | G02F 1/133615 |
| | | | | 349/58 |
| 2023/0359087 A1* | 11/2023 | Ikeda | ................. | G02F 1/136286 |
| 2024/0045274 A1* | 2/2024 | Igeta | ................. | G02F 1/133377 |

FOREIGN PATENT DOCUMENTS

JP 2019-174531 A 10/2019

* cited by examiner

*Primary Examiner* — Lucy P Chien
(74) *Attorney, Agent, or Firm* — XSENSUS LLP

(57) ABSTRACT

According to one embodiment, a display device includes a first transparent substrate, a display panel, a first fixing member, and a first light source unit. The first transparent substrate has a first light incident surface which is a side surface, and is formed to be curved. The display panel has flexibility. The first fixing member fixes the display panel to the first transparent substrate. The first light source unit is opposed to the first light incident surface to emit light to the first light incident surface.

17 Claims, 19 Drawing Sheets

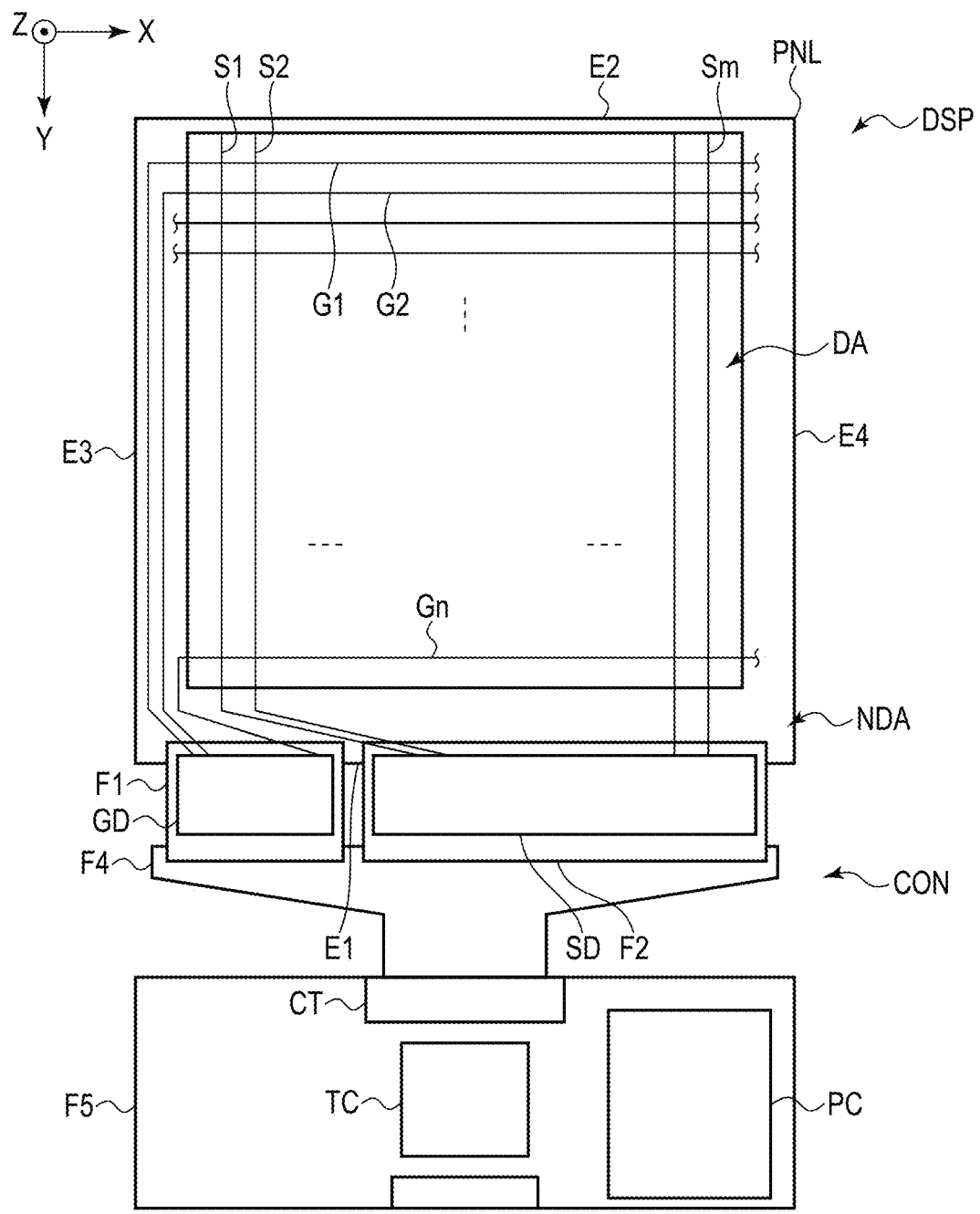
F I G. 1

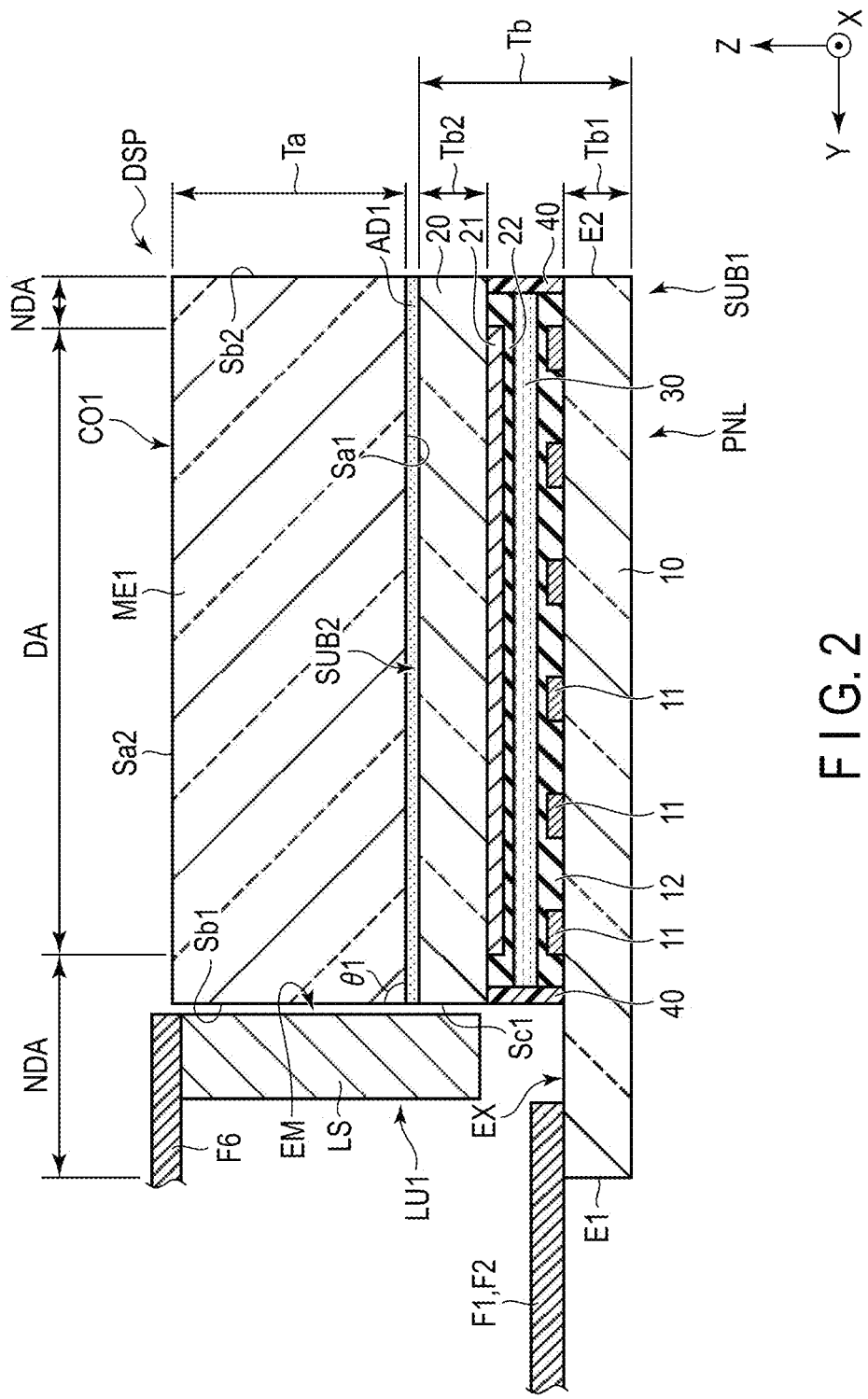
F I G. 2

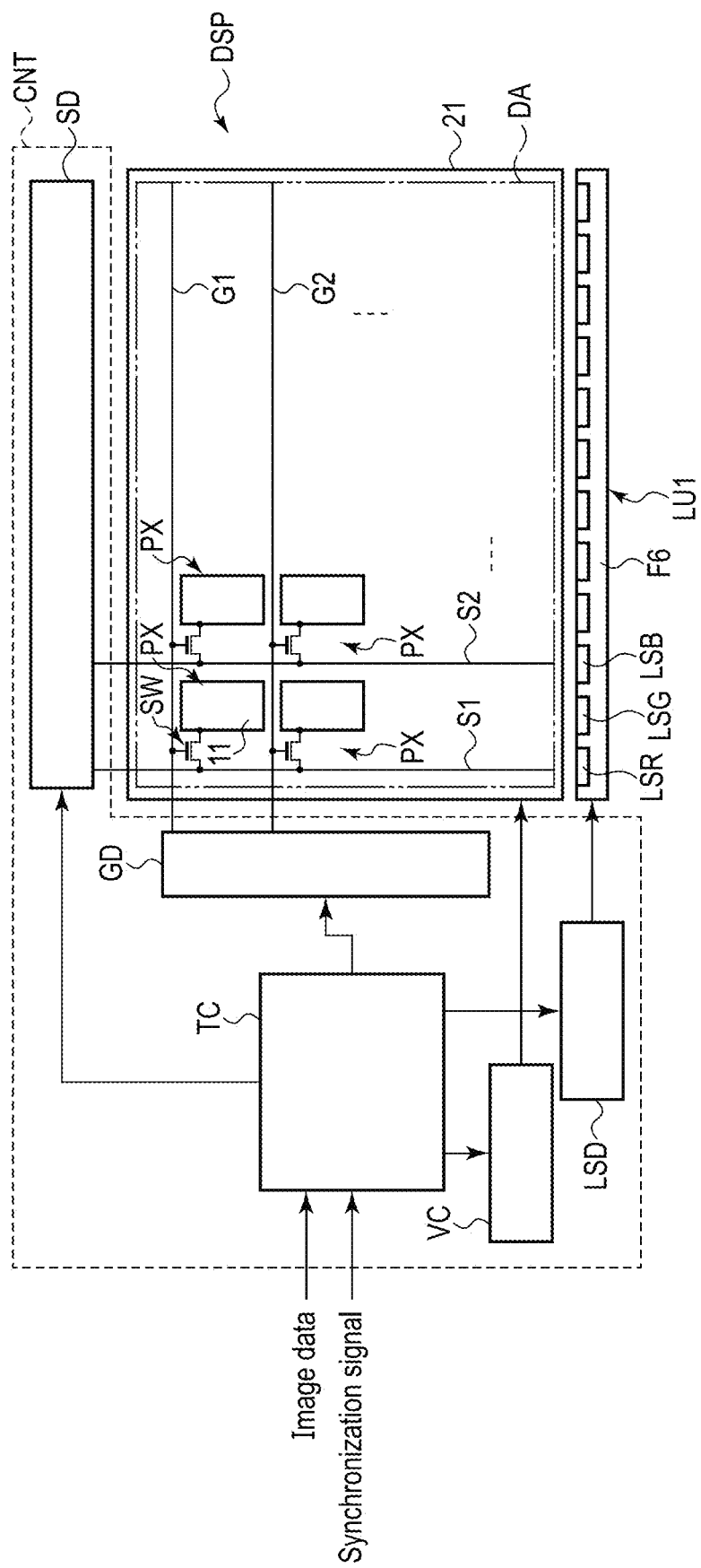
F I G. 3

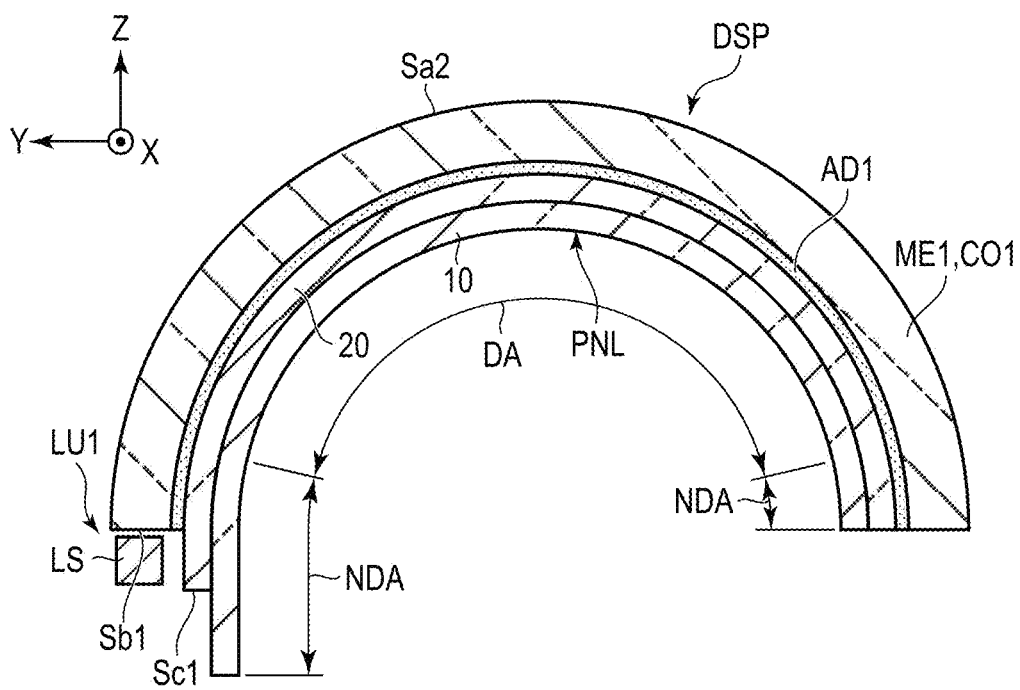
F I G. 15
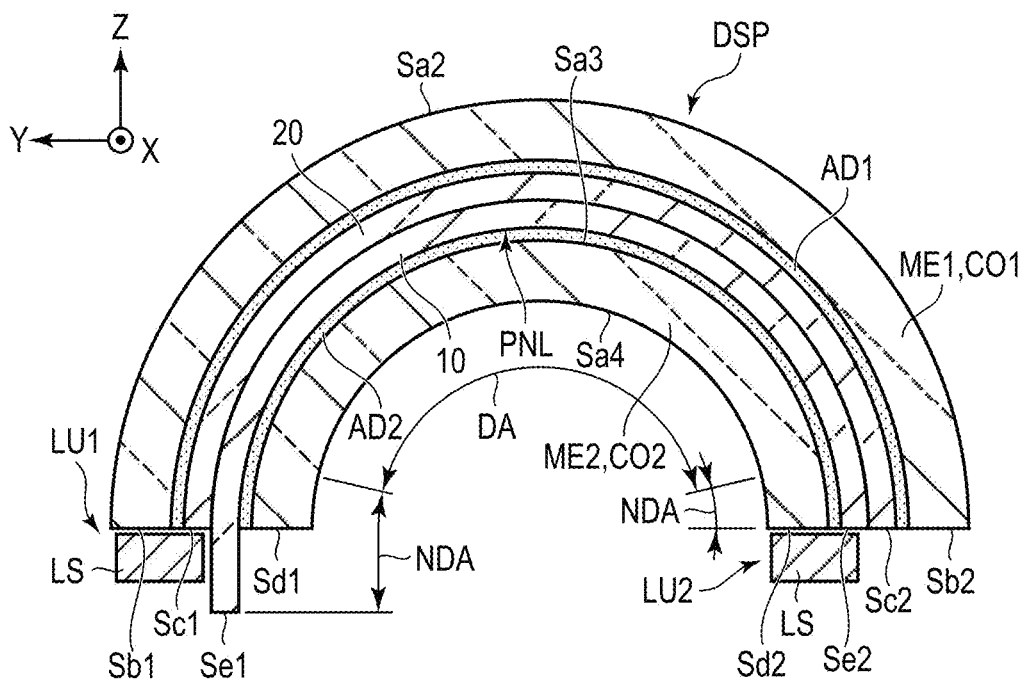
F I G. 16

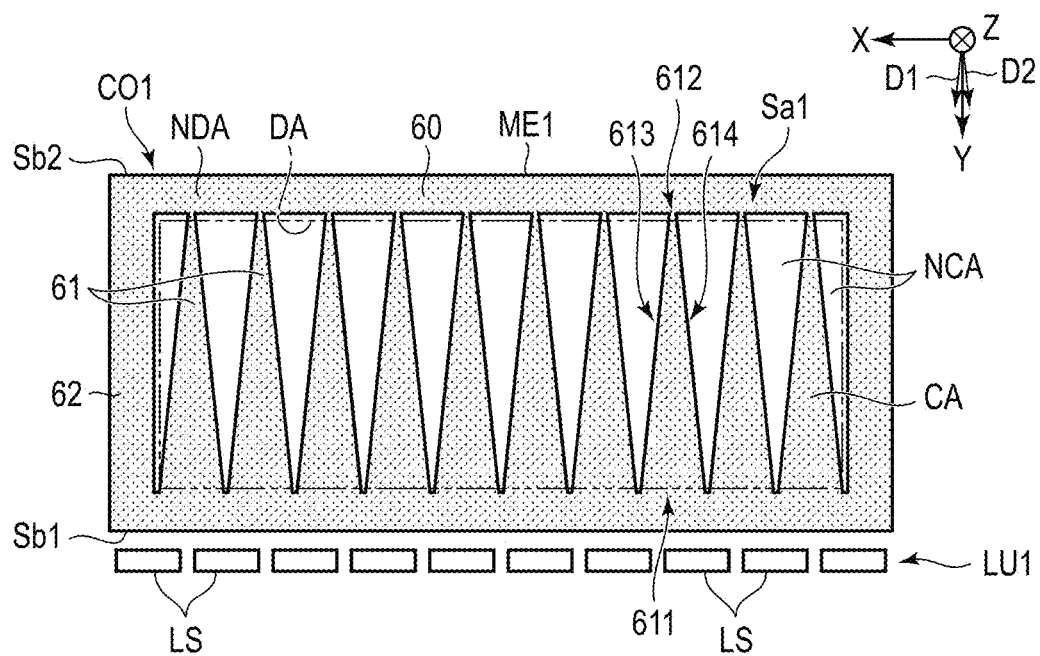
F I G. 19
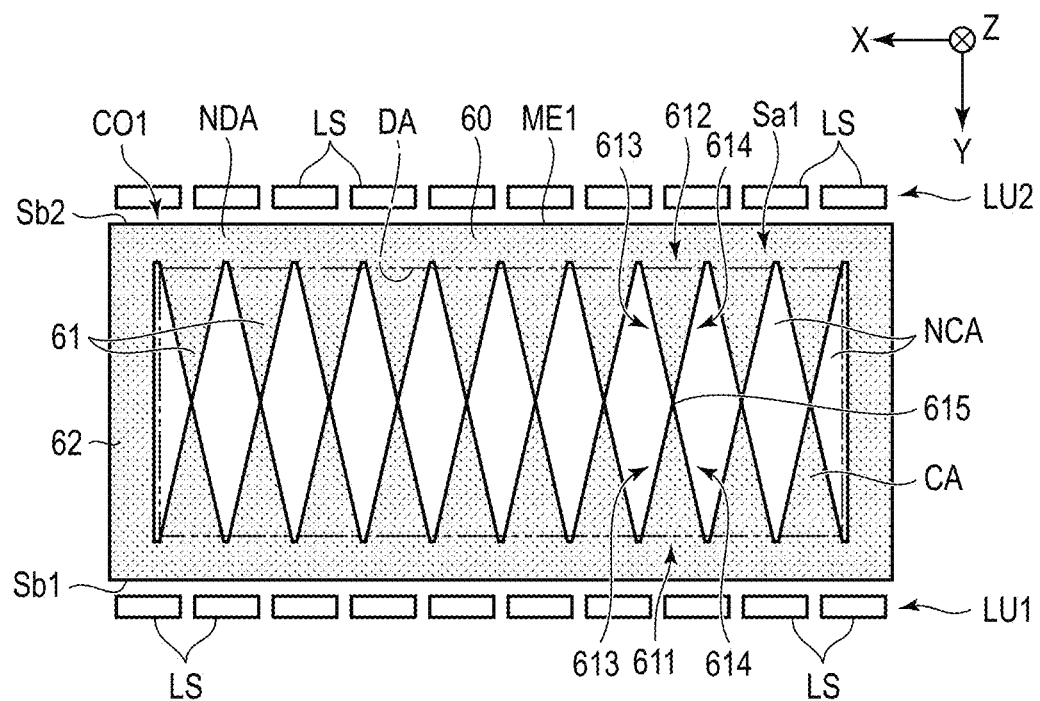
F I G. 20

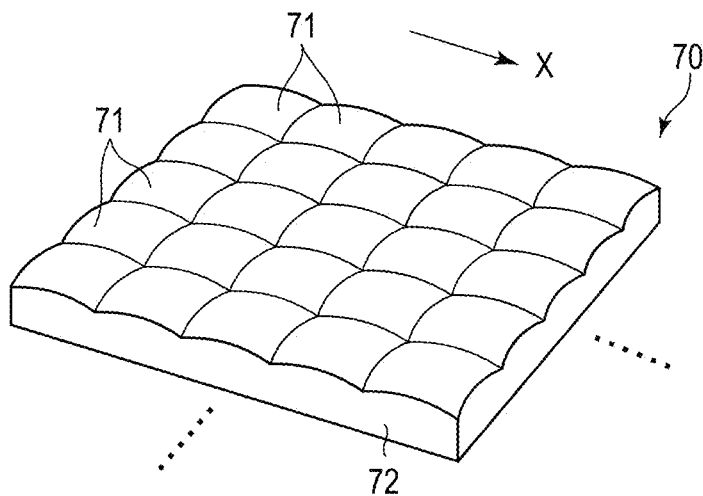
F I G. 23
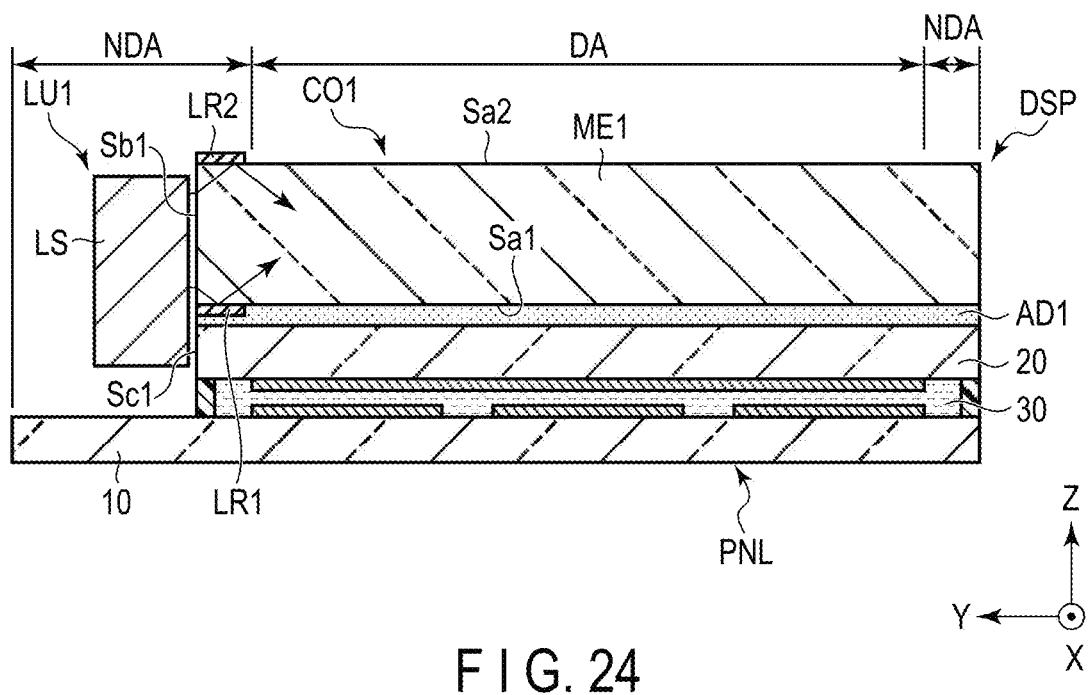
F I G. 24

DISPLAY DEVICE

CROSS-REFERENCE TO RELATED APPLICATION

This application is based upon and claims the benefit of priority from Japanese Patent Application No. 2023-088019, filed May 29, 2023, the entire contents of which are incorporated herein by reference.

FIELD

Embodiments described herein relate generally to a display device.

BACKGROUND

Recently, display devices comprising a polymer dispersed liquid crystal (hereinafter referred to as "PDLC") panel capable of switching a diffusing state of diffusing incident light and a transmitting state of allowing the incident light to be transmitted, displaying an image, and allowing a background to be transmitted and the image to be visually recognized, have been proposed. In such a display device, one frame period includes sub-frame periods, and multicolor display is implemented by displaying the image while changing a display color in each of the sub-frame period.

BRIEF DESCRIPTION OF THE DRAWINGS

FIG. 1 is a plan view showing a configuration example of a display device of a first embodiment.

FIG. 2 is a developed cross-sectional view showing the display device shown in FIG. 1.

FIG. 3 is a diagram showing main constituent elements of the display device shown in FIG. 1.

FIG. 15 is a cross-sectional view showing the display device according to modified example 2 of the first embodiment.

FIG. 16 is a cross-sectional view showing the display device according to modified example 3 of the first embodiment.

FIG. 19 is a plan view showing the cover panel and the first light source unit according to modified example 1 of the second embodiment, developing the cover panel.

FIG. 20 is a plan view showing the cover panel, the first light source unit, and a second light source unit according to modified example 2 of the second embodiment, developing the cover panel.

FIG. 23 is a perspective view showing a part of the optical member of the third embodiment.

FIG. 24 is a developed cross-sectional view showing a display device of a fourth embodiment.

DETAILED DESCRIPTION

Figure 4A:
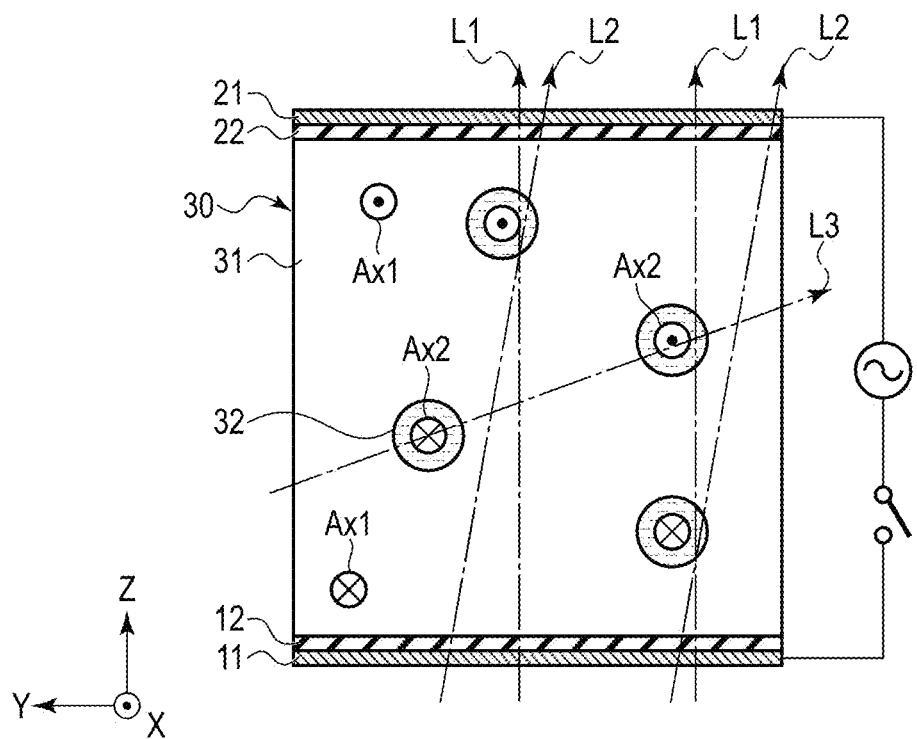
FIG. 4A is a diagram showing a part of a display panel of the display device, schematically showing a liquid crystal layer in a transparent state.

In general, according to one embodiment, there is provided a display device comprising: a first transparent substrate having a first main surface, a second main surface on a side opposite to the first main surface, and a first light incident surface, which is a side surface located between the first main surface and the second main surface, and being formed to be curved; a display panel having a display area where an image is displayed and external light is transmitted, being opposed to the first main surface of the first transparent substrate, and having flexibility; a first fixing member located between the first transparent substrate and the display panel to fix the display panel to the first transparent substrate; and a first light source unit opposed to the first light incident surface of the first transparent substrate to emit light to the first light incident surface.

According to another embodiment, there is provided a display device comprising: a non-flexible first transparent substrate having a curved main surface; a flexible display panel opposed to the main surface of the first transparent substrate and fixed to the first transparent substrate; and a light source opposed to a first side surface of the first transparent substrate to emit light to the first side surface. A side of the display panel, which is opposite to the first transparent substrate, is visually recognizable from a side of the first transparent substrate.

Embodiments will be described hereinafter with reference to the accompanying drawings. The disclosure is merely an example, and proper changes within the spirit of the invention, which are easily conceivable by a person of ordinary skill in the art, are included in the scope of the invention as a matter of course. In addition, in some cases, in order to make the description clearer, the widths, thicknesses, shapes and the like, of the respective parts are illustrated schematically in the drawings, rather than as an accurate representation of what is implemented, but such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

In each of the embodiments, a display device employing polymer dispersed liquid crystal will be described as an example of the display device.

First Embodiment

FIG. 1 is a plan view showing a configuration example of a display device DSP according to the present embodiment.

As shown in FIG. 1, a first direction X and a second direction Y are directions intersecting each other, and a third direction Z is a direction intersecting the first direction X and the second direction Y. The first direction X corresponds to the row direction while the second direction Y corresponds to the columnar direction. For example, the first direction X, the second direction Y, and the third direction Z are orthogonal to one another but may intersect at an angle other than 90 degrees. In the present specification, a direction forwarding a tip of an arrow indicating the third direction Z is called an upward direction (or, more simply, upwardly) and a direction forwarding oppositely from the tip of the arrow is called a downward direction (or, more simply, downwardly).

The display device DSP comprises the display panel PNL, wiring boards F1, F2, F4, and F5, and the like. The display panel PNL includes a display area DA on which images are displayed and a frame-shaped non-display area NDA surrounding the display area DA. The display area DA includes n gate lines G (G1 to Gn), m source lines S (S1 to Sm), and the like. Incidentally, each of n and m is a positive integer, and n may be equal to or different from m. The plurality of gate lines G extend in the first direction X and are arranged to be spaced apart in the second direction Y. In other words, the plurality of gate lines G extend in the row direction. The plurality of source lines S extend in the second direction Y and are arranged to be spaced apart in the first direction X. The display panel PNL includes end portions E1 and E2 along the first direction X, and end portions E3 and E4 along the second direction Y.

The wiring board F1 includes a gate driver GD. The plurality of gate lines G are connected to the gate driver GD. The wiring board F2 includes a source driver SD. The plurality of source lines S are connected to the source driver SD. Each of the wiring boards F1 and F2 is connected to the display panel PNL and the wiring board F4. The wiring board F5 includes a timing controller TC, a power supply circuit PC, and the like. The wiring board F4 is connected to a connector CT of the wiring board F5. Incidentally, the wiring boards F1 and F2 may be replaced with single wiring boards. Alternatively, the wiring boards F1, F2, and F4 may be replaced with single wiring boards. The gate driver GD, the source driver SD, and the timing controller TC described above constitute the control unit CON of the present embodiment, and the control unit CON is configured to control the drive of each of the plurality of gate lines G, the plurality of source lines S, a plurality of pixel electrodes to be described later, a common electrode to be described later, and the light source unit to be described later.

FIG. 2 is a developed cross-sectional view showing the display device DSP shown in FIG. 1. Incidentally, an actual first transparent substrate ME1 and an actual display panel PNL are curved. Main portions alone in the cross-section of the display device DSP in a Y-Z plane defined by the second direction Y and the third direction Z will be described here.

As shown in FIG. 2, the display device DSP comprises a cover panel CO1. The cover panel CO1 comprises the first transparent substrate ME1. The first transparent substrate ME1 is a cover glass and is formed of glass. The first transparent substrate ME1 is a non-flexible substrate. The first transparent substrate ME1 overlaps with at least the entire display area DA.

The first transparent substrate ME1 has a first main surface Sa1, a second main surface Sa2, a side surface Sb1, and a side surface Sb2. The second main surface Sa2 is located on a side opposite to the first main surface Sa1. The side surface Sb1 is located between the first main surface Sa1 and the second main surface Sa2. The side surface Sb1 is a first light incident surface. The side surface Sb2 is located between the first main surface Sa1 and the second main surface Sa2 and is also located on a side opposite to the side surface Sb1. In the present embodiment, the side surface Sb1 and the side surface Sb2 are located in the non-display area NDA. An angle between the first main surface Sa1 and the side surface Sb1 is referred to as θ1. In the present embodiment, the angle θ1 is 90 degrees.

The display panel PNL has a display area DA where images are displayed and external light is transmitted. The display panel PNL is opposed to the first main surface Sa1 of the first transparent substrate ME1. The display panel PNL has flexibility. The display panel PNL comprises a first substrate SUB1, a second substrate SUB2, a liquid crystal layer 30 serving as a display function layer, and the like. The first substrate SUB1 comprises a transparent first basement 10, a pixel electrode 11, an alignment film 12, and the like. The second substrate SUB2 comprises a transparent second basement 20, a common electrode 21, an alignment film 22, and the like. The second basement 20 is located between the first basement 10 and the first transparent substrate ME1. The pixel electrodes 11 and the common electrode 21 are formed of, for example, a transparent conductive material such as indium tin oxide (ITO) or indium zinc oxide (IZO). The liquid crystal layer 30 is located in at least the display area DA.

The liquid crystal layer 30 is located between the first basement 10 (first substrate SUB1) and the second basement 20 (second substrate SUB2). More specifically, the liquid crystal layer 30 is located between the alignment films 12 and 22. The liquid crystal layer 30 contains polymer dispersed liquid crystal. The liquid crystal layer 30 of the present embodiment uses reverse mode polymer dispersed liquid crystal (R-PDLC). The liquid crystal layer 30 maintains parallelism of incident light when the applied voltage is low or scatters the incident light when the applied voltage is high. The first substrate SUB1 and the second substrate SUB2 are bonded to each other by a sealing material 40. The first substrate SUB1 comprises an extending portion EX that extends farther in the second direction Y than a side surface Sc1 of the second basement 20.

A first adhesive sheet AD1 is located between the first transparent substrate ME1 and the display panel PNL and adheres the display panel PNL to the first transparent substrate ME1. The first adhesive sheet AD1 contacts and sticks to the first transparent substrate ME1 on one side and contacts and sticks to the display panel PNL on the other side. The first adhesive sheet AD1 overlaps with at least the entire display area DA. The first adhesive sheet AD1 is formed of an optical clear adhesive (OCA) as a solid adhesive. However, the first adhesive sheet AD1 may be formed of a material other than OCA, for example, optically clear resin (OCR). Furthermore, the display panel PNL and the first transparent substrate ME1 may be bonded. In other words, the present embodiment includes a structure in which the display panel PNL and the first transparent substrate ME1 are fixed. Therefore, the first adhesive sheet AD1 is also referred to as a first fixing member. In addition, no air layer is desirably located between the display panel PNL and the first transparent substrate ME1.

The wiring boards F1 and F2 are connected to the extending portion EX of the first substrate SUB1.

A first light source unit LU1 is located in the non-display area NDA outside the display area DA. The first light source unit LU1 comprises a light emitting element LS, a wiring board F6, and the like. The light emitting element LS is connected to the wiring board F6 and located on the extending portion EX. The light emitting element LS includes a light emitting portion (light emitting surface) EM that is opposed to the side surface Sb1 to emit light to the side surface Sb1.

The illumination light emitted from the light emitting portion EM is made incident on the side surface Sb1 and propagates through the first transparent substrate ME1 (cover panel CO1), the first adhesive sheet AD1, and the display panel PNL, as described below. In the present embodiment, the light emitting portion EM is also opposed to the side surface Sc1 of the second basement 20. The illumination light emitted from the light emitting portion EM is also made incident on the side surface Sc1.

Each of the first basement 10 and the second basement 20 is formed of glass. The first basement 10 has a thickness Tb1 and the second basement 20 has a thickness Tb2. Each of the thickness Tb1 and the thickness Tb2 is 0.2 mm or less. More specifically, each of the thickness Tb1 and the thickness Tb2 is 0.1 to 0.2 mm. In the present embodiment, each of the thickness Tb1 and the thickness Tb2 is 0.15 mm. The display panel PNL can be made flexible by forming the first basement 10 and the second basement 20 to be thin.

The first transparent substrate ME1 has a thickness Ta and the display panel PNL has a thickness Tb, in the direction in which the first transparent substrate ME1 and the display panel PNL are aligned. The thickness Tb includes the thickness Tb1, the thickness Tb2, the thickness of the liquid crystal layer 30, and the like. The thickness Ta of the first transparent substrate ME1 is desirably larger than the thickness Tb of the display panel PNL. In the present embodiment, the thickness Ta of the first transparent substrate ME1 is greater than the thickness Tb of the display panel PNL. The thickness Ta is 0.7 to 3.0 mm.

As described above, even if the thickness Tb2 of the second basement 20 is reduced, the first transparent substrate ME1 has a thickness Ta greater than the thickness Tb2. The first light source unit LU1 can emit light to the side surface Sb1 of the first transparent substrate ME1. Therefore, the user can visually recognize the display images of the display device DSP desirably as compared to the case where the first light source unit LU1 emits light to the side surface Sc1 of the second basement 20. For example, the contrast ratio of the display device DSP can be increased.

In the present embodiment, the first light source unit LU1 emits light not only to the side surface Sb1 but also to the side surface Sc1. Therefore, the user can visually recognize the display image of the display device DSP further desirably.

FIG. 3 is a diagram showing main constituent elements of the display device DSP shown in FIG. 1.

As shown in FIG. 3, the display device DSP comprises a controller CNT represented by a dashed line in the drawing. The controller CNT includes a timing controller TC, a gate driver GD, a source driver SD, a Vcom circuit VC, a light source driver LSD, and the like.

The timing controller TC generates various signals, based on image data, a synchronization signal, and the like input from the outside. In one example, the timing controller TC outputs a video signal generated by executing predetermined signal processing, based on the image data, to the source driver SD. In addition, the timing controller TC outputs the control signals generated based on the synchronization signals to each of the gate driver GD, the source driver SD, the Vcom circuit VC, and the light source driver LSD. The timing controller TC will be described below in detail.

The display area DA represented by a two-dotted-chain line in the drawing includes a plurality of pixels PX. Each of the pixels PX comprises a switching element SW and the pixel electrode 11. The switching element SW is formed of, for example, a thin-film transistor. The switching element SW is electrically connected to the gate line G and the source line S. The plurality of pixel electrodes 11 are located in the display area DA and arrayed in a matrix. For this reason, for example, the plurality of pixel electrodes 11 are provided in a plurality of rows. The pixel electrode 11 is connected to the source line S via the switching element SW. The common electrode 21 is located in the display area DA. The common electrode 21 is opposed to the plurality of pixel electrodes 11. Incidentally, unlike the present embodiment, the common electrode 21 may be divided for each of at least one pixel PX and connected to each common line, and a common voltage may be applied to the divided common electrodes.

A gate signal is supplied from the gate driver GD to each of the gate lines G. A video signal (image signal) is supplied from the source driver SD to each of the source lines S. A common voltage Vcom is supplied from the Vcom circuit VC to the common electrode 21. The video signal supplied to the source line S is applied to the pixel electrode 11 connected to the switching element SW in a period in which the switching element SW becomes a conductive state based on the gate signal supplied to the gate line G. In the following description, supplying a video signal to the pixel electrode 11 to form a potential difference between the pixel electrode 11 and the common electrode 21 may be described as writing a video signal (or applying a voltage) to the pixel PX comprising the pixel electrode 11.

The first light source unit LU1 is configured to emit light to the liquid crystal layer 30. In the present embodiment, the first light source unit LU1 is configured to emit light of a color other than achromatic color to the liquid crystal layer 30. The first light source unit LU1 comprises light emitting elements LS of a plurality of colors. For example, the first light source unit LU1 comprises a light emitting element (first light emitting element) LSR which emits light of a first color to the liquid crystal layer 30, a light emitting element (second light emitting element) LSG which emits light of a second color to the liquid crystal layer 30, and a light emitting element (third light emitting element) LSB which emits light of a third color to the liquid crystal layer 30. It is needless to say that the first, second, and third colors are different from one another. In the present embodiment, the first color is red, the second color is green, and the third color is blue.

The light source driver LSD controls lighting periods of the light emitting elements LSR, LSG, and LSB. As will be described in detail later, in a drive system where one frame period includes a plurality of sub-frame periods, at least one of the three light emitting elements LSR, LSG, and LSB is turned on in each sub-frame, and the color of the illumination light is switched in each sub-frame.

A configuration example of the display device comprising the liquid crystal layer 30 which is a polymer dispersed liquid crystal layer will be described below.

FIG. 4A is a diagram showing a part of the display panel PNL, schematically illustrating the liquid crystal layer 30 in a transparent state.

As shown in FIG. 4A, the liquid crystal layer 30 contains a liquid crystalline polymer 31 that is a streaky polymer, and liquid crystalline molecules 32. The liquid crystalline polymer 31 can be obtained by, for example, polymerizing liquid crystalline monomer in a state of being aligned in a predetermined direction by the alignment restriction force of the alignment films 12 and 22. The liquid crystalline molecules 32 are dispersed in the liquid crystalline monomer, and are aligned in a predetermined direction depending on the alignment direction of the liquid crystalline monomer when the liquid crystalline monomer is polymerized. In the present embodiment, the alignment films 12 and 22 are horizontal alignment films that perform initial alignment of the liquid crystalline monomer and the liquid crystalline molecules 32 along an X-Y plane defined by the first direction X and the second direction Y. The liquid crystalline molecules 32 are positive liquid crystalline molecules having positive dielectric anisotropy.

Unlike the present embodiment, however, the alignment films 12 and 22 may be vertical alignment films that perform initial alignment of the liquid crystalline monomer and the liquid crystalline molecules 32 along the third direction Z. Alternatively, the liquid crystalline molecules 32 may be negative liquid crystalline molecules having negative dielectric anisotropy.

The liquid crystalline polymer 31 and the liquid crystalline molecules 32 have equivalent optical anisotropy. Alternatively, the liquid crystalline polymer 31 and the liquid crystalline molecules 32 have approximately equivalent refractive anisotropy. In other words, an ordinary refractive index and an extraordinary refractive index of each of the liquid crystalline polymer 31 and the liquid crystalline molecules 32 are approximately equal to each other. Incidentally, for both the ordinary refractive index and the extraordinary refractive index, values of the liquid crystalline polymer 31 and the liquid crystalline molecules 32 may not completely match each other, and a deviation caused by an error in manufacturing or the like is allowed. In addition, the liquid crystalline polymer 31 and the liquid crystalline molecules 32 are different in responsiveness to the electric field. In other words, the responsiveness of the liquid crystalline polymer 31 to the electric field is lower than the responsiveness of the liquid crystalline molecules 32 to the electric field.

The example shown in FIG. 4A corresponds to a state in which no voltage is applied to the liquid crystal layer 30 (for example, a state in which a potential difference between the pixel electrode 11 and the common electrode 21 is zero) or a state in which a second transparent voltage to be described below is applied to the liquid crystal layer 30.

As shown in FIG. 4A, an optical axis Ax1 of the liquid crystalline polymer 31 and an optical axis Ax2 of the liquid crystalline molecules 32 are parallel to each other. In the example illustrated, each of the optical axis Ax1 and the optical axis Ax2 is parallel to the first direction X. The optical axis corresponds to a line parallel to a direction of travel of the light beam in which the refractive indexes indicate one value irrespective of the direction of polarization.

As described above, since the liquid crystalline polymer 31 and the liquid crystalline molecules 32 have approximately equal refractive anisotropy and the optical axes Ax1 and Ax2 are parallel to each other, there is almost no refractive index difference between the liquid crystalline polymer 31 and the liquid crystalline molecules 32 in all directions including the first direction X, the second direction Y, and the third direction Z. For this reason, light beams L1 made incident on the liquid crystal layer 30 in the third direction Z are transmitted without being substantially scattered in the liquid crystal layer 30. The liquid crystal layer 30 can maintain the parallelism of the light beams L1. Similarly, light beams L2 and L3 made incident in a direction oblique with respect to the third direction z are not substantially scattered in the liquid crystal layer 30, either. High transparency can be therefore obtained. The state illustrated in FIG. 4A is referred to as a "transparent state".

Figure 4B:
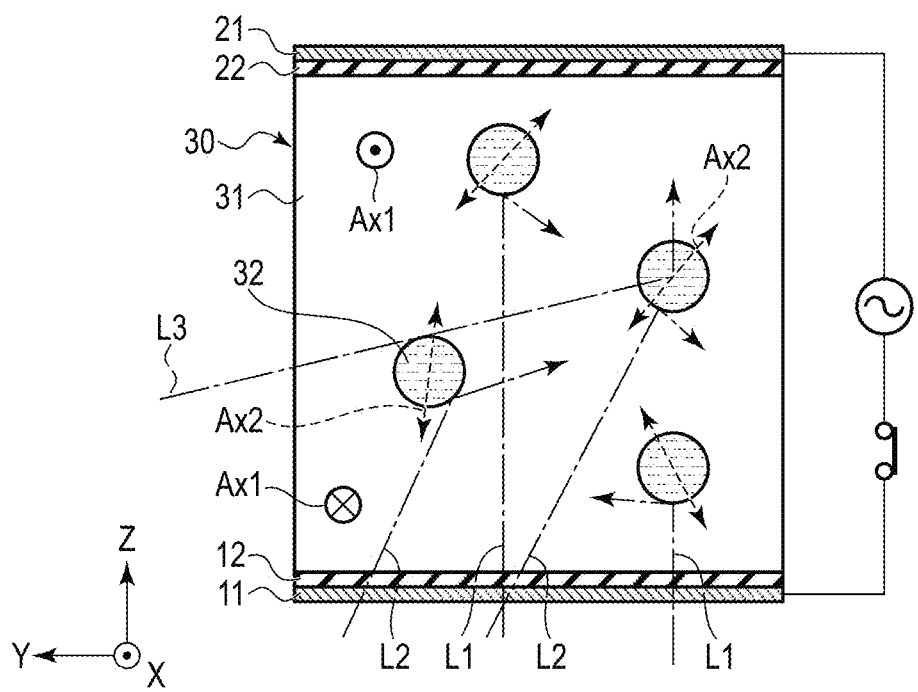
FIG. 4B is a diagram showing a part of the display panel, schematically showing the liquid crystal layer in a scattered state.

FIG. 4B is a diagram showing a part of the display panel PNL, schematically showing the liquid crystal layer 30 in a scattered state.

As shown in FIG. 4B, as described above, the responsiveness of the liquid crystalline polymer 31 to the electric field is lower than the responsiveness of the liquid crystalline molecule 32 to the electric field. For this reason, in a state in which a voltage (scattering voltage to be described below) higher than each of the second transparent voltage and a first transparent voltage to be described below is applied to the liquid crystal layer 30, the alignment direction of the liquid crystalline molecules 32 is changed in accordance with the electric field while the alignment direction of the liquid crystalline polymer 31 is hardly changed. In other words, as shown in the drawing, the optical axis Ax1 is substantially parallel to the first direction X while the optical axis Ax2 is oblique to the first direction X. For this reason, the optical axes Ax1 and optical axes Ax2 intersect each other. Therefore, a large refractive index difference is made between the liquid crystalline polymer 31 and the liquid crystalline molecules 32 in all the directions including the first direction X, the second direction Y, and the third direction Z. The light beams L1 to L3 made incident on the liquid crystal layer 30 are thereby scattered in the liquid crystal layer 30. The state shown in FIG. 4B is referred to as a "scattered state".

The control unit CON switches the state of the liquid crystal layer 30 to at least one of the transparent state and the scattered state.

Figure 5A:
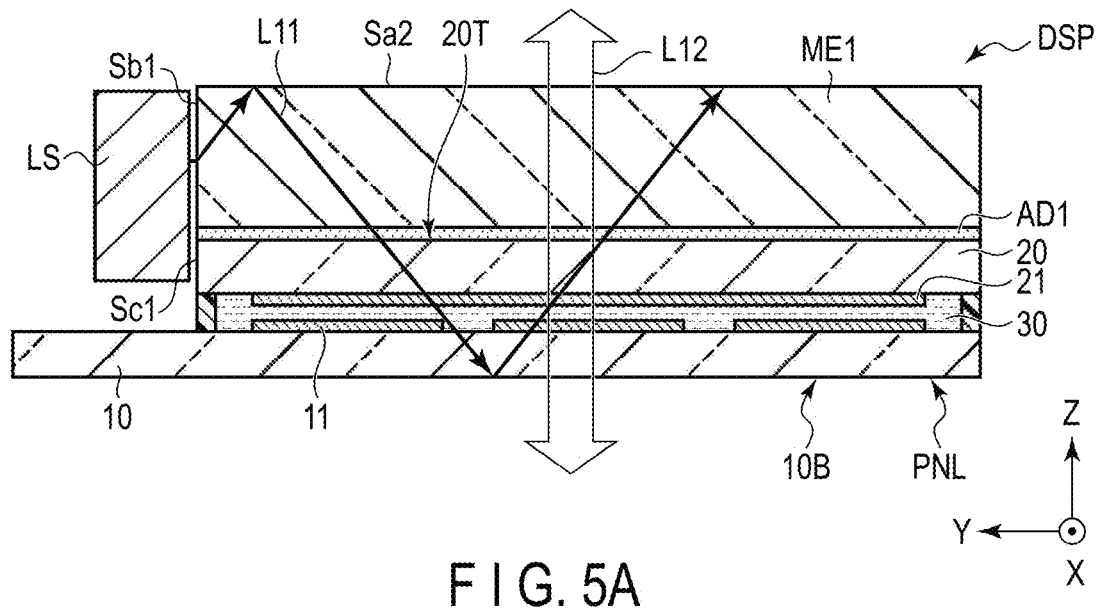
FIG. 5A is a developed cross-sectional view showing the display panel in a case where when the liquid crystal layer is in a transparent state and a first transparent substrate, together with a light emitting element.

FIG. 5A is a developed cross-sectional view showing the display panel PNL in a case where when the liquid crystal layer 30 is in a transparent state and the first transparent substrate ME1, together with the light emitting element LS. As shown in FIG. 5A, the first basement 10 has a lower surface 10B and the second basement 20 has an upper surface 20T. Illumination light emitted from the light emitting element LS is made incident on the cover panel CO1 and the display panel PNL from the side surface Sb1 of the first transparent substrate ME1 and the side surface Sc1 of the second basement 20.

For example, the illumination light L11 emitted from the light emitting element LS and made incident on the side surface Sb1 of the first transparent substrate ME1 propagates through the first transparent substrate ME1, the first adhesive sheet AD1, the second basement 20, the liquid crystal layer 30, the first basement 10, and the like. When the liquid crystal layer 30 is in a transparent state, the illumination light L11 is hardly scattered by the liquid crystal layer 30 and therefore rarely leaks out from the lower surface 10B of the first basement 10 and the second main surface Sa2 of the first transparent substrate ME1.

An external light beam L12 made incident on the display panel PNL is transmitted and hardly scattered in the liquid crystal layer 30. In other words, external light made incident on the display panel PNL from the lower surface 10B is transmitted to the second main surface Sa2 of the first transparent substrate ME1, and external light made incident from the second main surface Sa2 is transmitted to the lower surface 10B. For this reason, when the display device DSP is observed from the second main surface Sa2 side, the user can visually recognize a background on the lower surface 10B side through the display panel PNL. Similarly, when the display device DSP is observed from the lower surface 10B side, the user can visually recognize a background on the second main surface Sa2 side through the display panel PNL.

Figure 5B:
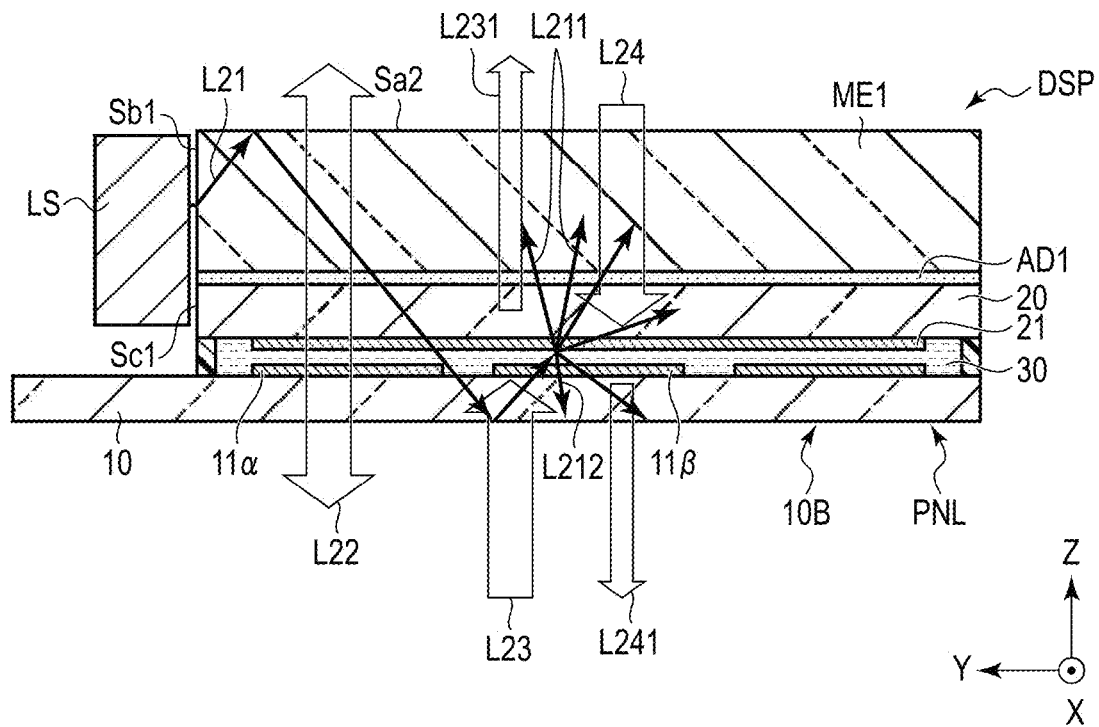
FIG. 5B is a developed cross-sectional view showing the display panel in a case where when the liquid crystal layer is in a scattered state and a first transparent substrate, together with a light emitting element.

FIG. 5B is a developed cross-sectional view showing the display panel PNL in a case where the liquid crystal layer 30 is in a scattered state and the first transparent substrate ME1, together with the light emitting element LS. As shown in FIG. 5B, illumination light emitted from the light emitting element LS is made incident on the cover panel CO1 and the display panel PNL from the side surface Sb1 of the first transparent substrate ME1 and the side surface Sc1 of the second basement 20.

For example, the illumination light L21 emitted from the light emitting element LS and made incident on the side surface Sb1 of the first transparent substrate ME1 propagates through the first transparent substrate ME1, the first adhesive sheet AD1, the second basement 20, the liquid crystal layer 30, the first basement 10, and the like. In the example illustrated, since the liquid crystal layer 30 between a pixel electrode 11α and the common electrode 21 (i.e., a liquid crystal layer to which a voltage applied between the pixel electrode 11α and the common electrode 21 is applied) is in a transparent state, the illumination light beam L21 is hardly scattered in an area opposed to the pixel electrode 11α, in the liquid crystal layer 30.

In contrast, since the liquid crystal layer 30 between a pixel electrode 11β and the common electrode 21 (i.e., a liquid crystal layer to which a voltage applied between the pixel electrode 11β and the common electrode 21 is applied) is in the scattered state, the illumination light beam L21 is scattered in an area opposed to the pixel electrode 11β, in the liquid crystal layer 30. A scattered light beam L211 of the illumination light beam L21 is emitted to the outside from the second main surface Sa2, and a scattered light beam L212 is emitted to the outside from the lower surface 10B.

At a position which overlaps with the pixel electrode 11α, an external light beam L22 made incident on the display panel PNL is transmitted and hardly scattered in the liquid crystal layer 30, similarly to the external light beam L12 shown in FIG. 5A. At a position which overlaps with the pixel electrode 11β, a light beam L231 of an external light beam L23 made incident from the lower surface 10B is scattered in the liquid crystal layer 30 and then transmitted through the second main surface Sa2. In addition, a light beam L241 of an external light beam L24 made incident from the second main surface Sa2 is scattered in the liquid crystal layer 30 and then transmitted through the lower surface 10B.

For this reason, when the display device DSP is observed from the second main surface Sa2 side, a color of the illumination light beam L21 can be visually recognized at a position which overlaps with the pixel electrode 11B. In addition, since the external light beam L231 is transmitted through the display panel PNL, the background on the lower surface 10B side can also be visually recognized through the display panel PNL. Similarly, when the display device DSP is observed from the lower surface 10B side, a color of the illumination light beam L21 can be visually recognized at a position which overlaps with the pixel electrode 11β. In addition, since the external light beam L241 is transmitted through the display panel PNL, the background on the second main surface Sa2 side can also be visually recognized through the display panel PNL. At a position which overlaps with the pixel electrode 11α, the color of the illumination light beam L21 can hardly be recognized visually and the background can be visually recognized through the display panel PNL since the liquid crystal layer 30 is in the transparent state.

Figure 6:
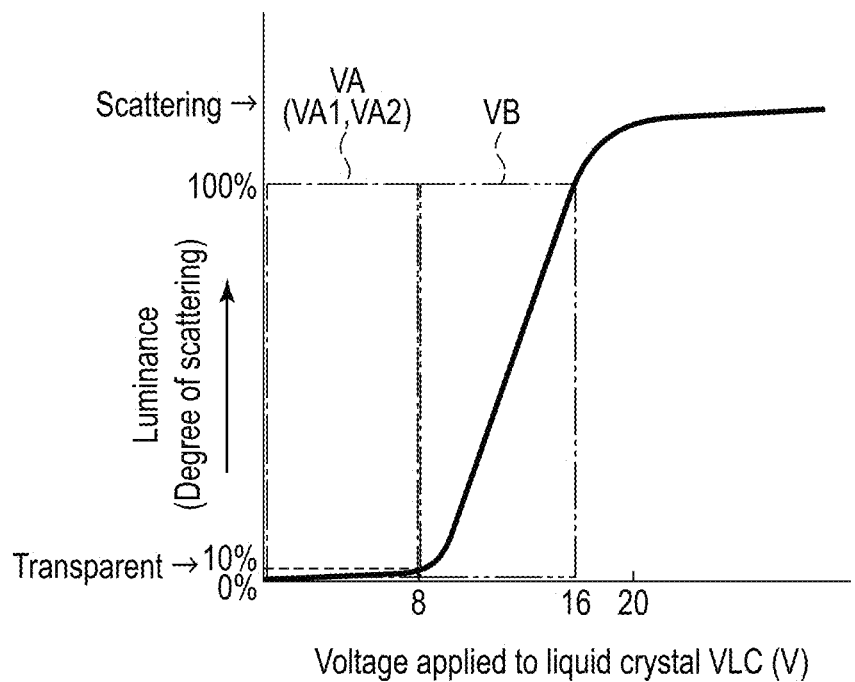
FIG. 6 is a graph showing scattering characteristics of the liquid crystal layer.

FIG. 6 is a graph showing the scattering characteristic of the liquid crystal layer 30, indicating a relationship between the luminance and a voltage VLC applied to the liquid crystal layer 30. In this example, the luminance corresponds to luminance of the scattered light beam L211 obtained when the illumination light beam L21 emitted from the light emitting element LS is scattered in the liquid crystal layer 30 as shown in, for example, FIG. 5B. This luminance indicates a scattering degree of the liquid crystal layer 30 from the other viewpoint.

As shown in FIG. 6, when the voltage VLC is increased from 0V, the luminance is rapidly increased from approximately 8V and saturated at approximately 20V. The luminance is also slightly increased when the voltage VLC is in a range from 0V to 8V. In the present embodiment, an area surrounded by a two-dot-chain line, i.e., a voltage in a range from 8V to 16V is used for reproduction of gradation (for example, 256 gradation) of each pixel PX. The voltage in a range $8V<VLC≤16V$ is hereinafter referred to as a scattering voltage. In addition, in the present embodiment, an area surrounded by a one-dot-chain line, i.e., the voltage in a range $0V≤VLC≤8V$ is referred to as a transparent voltage. A transparent voltage VA includes the first transparent voltage VA1 and the second transparent voltage VA2 described above. Incidentally, the lower and upper limits of the scattering voltage VB and the transparent voltage VA are not limited to this example and can be determined as appropriate according to the scattering characteristics of the liquid crystal layer 30.

The degree of scattering in a case where the degree of scattering of the light made incident on the liquid crystal layer 30 is the highest when the scattering voltage VB is applied to the liquid crystal layer 30 is assumed to be 100%. In this example, the degree of scattering in a case of applying the scattering voltage VB of 16V to the liquid crystal layer 30 is assumed to be 100%. For example, the transparent voltage VA can be defied as a voltage in a range of the voltage VLC where the degree of scattering (luminance) is less than 10%. Alternatively, the transparent voltage VA can also be defined as the voltage VLC lower than or equal to a voltage (8V in the example of FIG. 6) corresponding to the lowest gradation.

In addition, the transparent voltage VA (first transparent voltage VA1 and second transparent voltage VA2) may be different from that in the example shown in FIG. 6. For example, the first transparent voltage VA1 may be a voltage with the degree of scattering in a range higher than or equal to 10% and lower than or equal to 50%. In addition, the second transparent voltage VA2 may be a voltage with the degree of scattering in a range lower than 10%.

Incidentally, the graph shown in FIG. 6 is applicable to a case where the polarity of the voltage applied to the liquid crystal layer 30 is positive polarity (+) and negative polarity (−). In the latter case, the voltage VLC is an absolute value of the negative-polarity voltage.

Figure 7A:
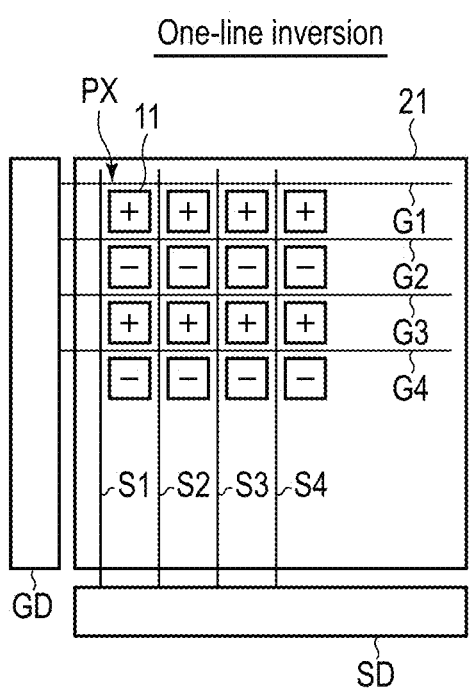
FIG. 7A is a diagram showing an outline of one-line inversion drive.
Figure 7B:
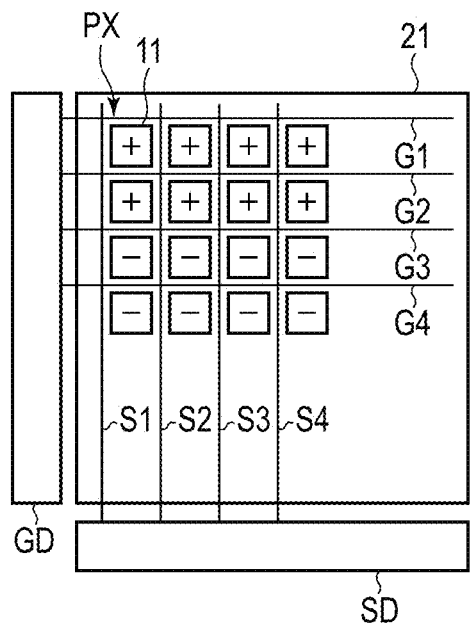
FIG. 7B is a diagram showing an outline of two-line inversion drive.
Figure 7C:
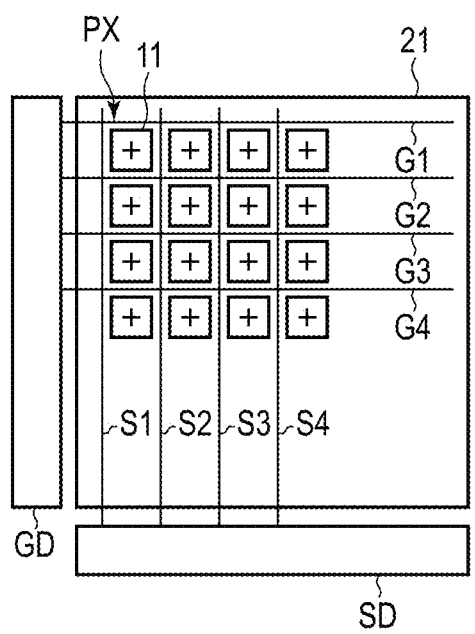
FIG. 7C is a diagram showing an outline of frame-inversion drive.

The polarity inversion drive scheme of inverting the polarity of the voltage applied to the liquid crystal layer 30 can be applied to the display device DSP. FIG. 7A, FIG. 7B, and FIG. 7C are diagrams showing an outline of the polarity inversion drive scheme.

FIG. 7A shows a one-line inversion drive scheme of inverting the positive polarity (+) and the negative polarity (−) of the voltage applied to the liquid crystal layer 30 (i.e., the voltage written to the pixel PX) in each group of pixels PX (one line) connected to one gate line G. In such a drive method, for example, the polarity of the common voltage supplied to the common electrode 21 and the polarity of the video signal supplied from the source driver SD to the source line S (polarity of the source line voltage) are inverted in each horizontal period in which the gate driver GD supplies the gate signal to the gate line G. In the same horizontal period, the polarity of the common voltage and the polarity of the video signal are, for example, opposite to each other.

FIG. 7B shows a two-line inversion drive scheme of inverting the positive polarity (+) and the negative polarity (−) of the voltage to be applied to the liquid crystal layer 30 in every two lines. The present invention is not limited to the example shown in FIG. 7A and FIG. 7B, but the polarity may be inverted in every three or more lines.

FIG. 7C shows a frame-inversion drive scheme of inverting the positive polarity (+) and the negative polarity (−) of the voltage applied to the liquid crystal layer 30 in each frame period for displaying an image corresponding to one piece of image data. In such a drive method, for example, the polarity of the common voltage and the polarity of the video signal are inverted in each frame period. In the same frame period, for example, the polarity of the common voltage and the polarity of the video signal are opposite to each other.

Figure 8:
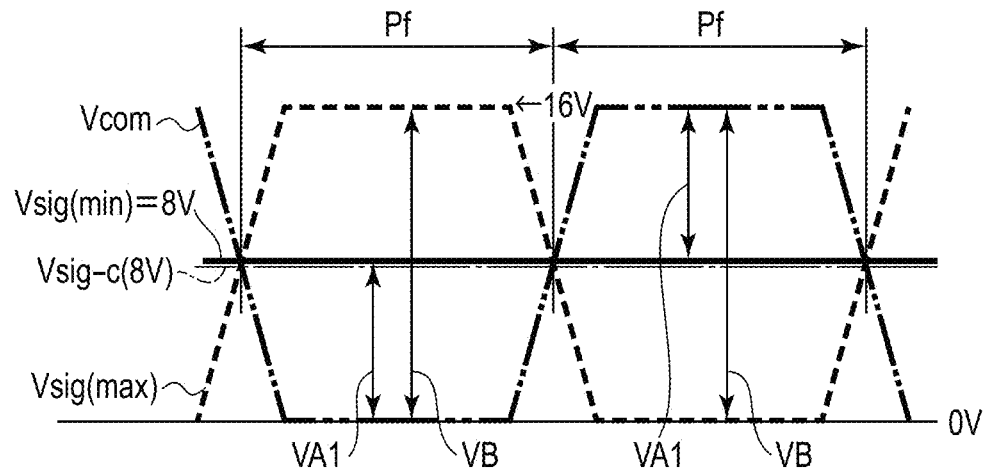
FIG. 8 is a chart showing an example of a common voltage and a source line voltage in display drive.

FIG. 8 is a chart showing an example of the common voltage Vcom supplied to the common electrode 21 and the source line voltage Vsig supplied to the source line S (or the pixel electrode 11) in the display drive to which the one-line inversion drive scheme shown in FIG. 7A is applied.

As shown in FIG. 8, a waveform corresponding to a maximum value (max) of gradation and a waveform corresponding to a minimum value (min) of gradation are illustrated with respect to the source line voltage Vsig. The waveform of the source line voltage Vsig (min) is represented by a solid line, the waveform of the common voltage Vcom is represented by a two-dot-chain line, and the waveform of the source line voltage Vsig (max) is represented by a broken line. In the example of this chart, the polarities of the common voltage Vcom and the source line voltage Vsig (cf., the waveform of the maximum value) are inverted in each frame period Pf. A reference voltage Vsig-c is, for example, 8V. The lower limit is 0V and the upper limit is 16V in each of the common voltage Vcom and the source line voltage Vsig.

However, when the frame period Pf includes a plurality of sub-frame periods, the polarity of the common voltage Vcom and the polarity of the source line voltage Vsig may be inverted in each frame period Pf, or may be inverted in each field period.

The polarity inversion drive scheme including not only the example shown in FIG. 8, but the example of FIG. 9 to be described later will be focused. When the drive voltage to be applied to the liquid crystal layer 30 (voltage to be written to the pixel PX) has a positive polarity, a difference (Vsig-Vcom) between the source line voltage Vsig and the common voltage Vcom becomes 0V or a positive voltage value. In contrast, when the drive voltage to be applied to the liquid crystal layer 30 (voltage to be written to the pixel PX) has negative polarity, the difference (Vsig-Vcom) between the source line voltage Vsig and the common voltage Vcom is 0V or a negative voltage value.

The polarity inversion drive scheme shown in FIG. 8 will be focused. In a period in which the positive-polarity voltage is written to the pixel PX, the common voltage Vcom becomes 0V, and the source line voltage Vsig becomes a voltage value corresponding to gradation indicated by image data in a range of 8V or more and 16V or less. In contrast, in a period in which the negative-polarity voltage is written to the pixel PX, the common voltage Vcom becomes 16V, and the source line voltage Vsig becomes a voltage value corresponding to gradation indicated by image data in a range of 0V or more and 8V or less. In other words, in any case, the voltage higher than or equal to 8V and lower than or equal to 16V is applied between the common electrode 21 and the pixel electrode 11.

As shown in FIG. 6, even when the voltage VLC applied to the liquid crystal layer 30 is 8V, i.e., the first transparent voltage VA1 is applied to the liquid crystal layer 30, the liquid crystal layer 30 has the degree of scattering of approximately 0 to 10%. Therefore, even when the source line voltage Vsig is set to the minimum value of the gradation, the external light made incident on the display panel PNL is slightly scattered, and the visibility of the background of the display panel PNL may be reduced.

For this reason, the visibility of the background of the display panel PNL can be improved by applying the transparent drive of making the voltage between the pixel electrode 11 and the common electrode 21 smaller than the lower limit of gradation to the sequence of image display.

Then, a relationship between the common voltage Vcom and the output of the source driver SD will be described.

When a withstand voltage of the source driver SD is low, the common voltage Vcom is inversely driven to increase the liquid crystal applied voltage. At this time, the source driver SD can simultaneously output only one of the positive-polarity source line voltage Vsig (for example, reference voltage Vsig-c to 16V) and the negative-polarity source line voltage Vsig (for example, 0V to reference voltage Vsig-c). In addition, the polarity of the common voltage Vcom is opposite to the polarity of the output of the source driver SD.

However, when the source driver SD of a high withstand voltage is used, the relationship between the source line voltage Vsig and the common voltage Vcom may be the same as the above-described relationship, but may also be a relationship to be described below. In other words, the common voltage Vcom is fixed to 0V, and the source line voltage Vsig output from the source driver SD is in a range between 0 and +16V at the positive polarity or a range between -16 and 0V at the negative polarity.

Figure 9:
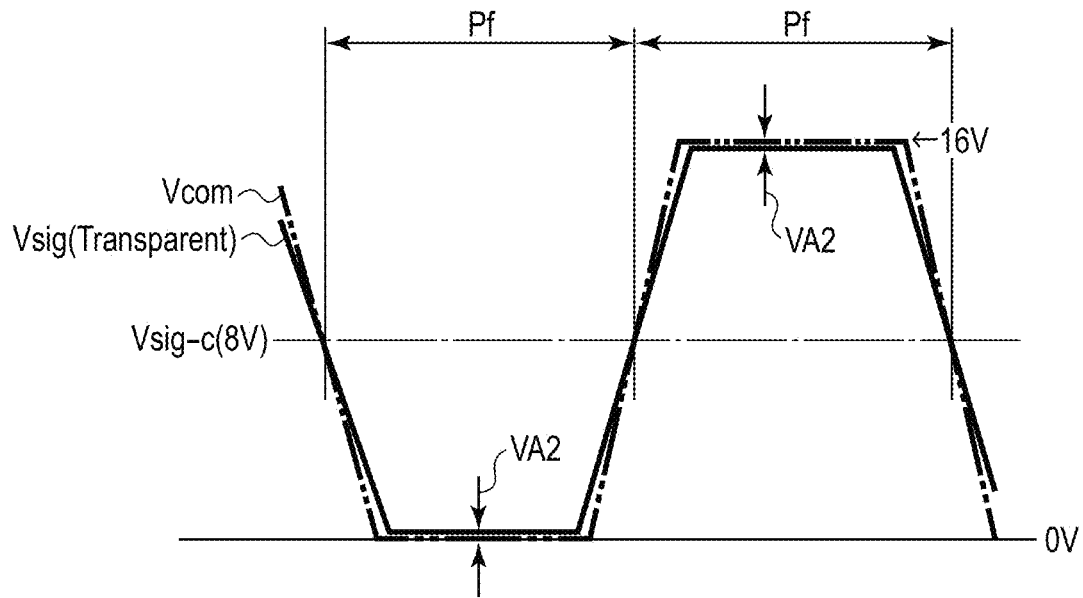
FIG. 9 is a chart showing an example of a common voltage and a source line voltage in a transparent drive.

FIG. 9 is a chart showing an example of the common voltage Vcom and the source line voltage Vsig in the transparent drive. The waveform of the source line voltage Vsig is represented by a solid line, and the waveform of the common voltage Vcom is represented by a two-dot-chain line.

As shown in FIG. 9, the common voltage Vcom is switched alternately to 0V and 16V in each frame period Pf, similarly to the example shown in FIG. 8. In the transparent drive, the voltage value of the source line voltage Vsig matches the common voltage Vcom (Vsig=Vcom=0V or Vsig=Vcom=16V) in each frame period Pf. In FIG. 9, in view of a relationship in illustration between the source line voltage Vsig and the common voltage Vcom, both of them are slightly shifted. For this reason, the voltage of 0V is applied to the liquid crystal layer 30. In other words, the second transparent voltage VA2 is applied to the liquid crystal layer 30.

However, the source line voltage Vsig in the transparent drive is not limited to the example shown in FIG. 9. For example, the source line voltage Vsig may be higher than 0V and less than 8V (0V<Vsig<8V) in a period in which the common voltage Vcom becomes 0V. The source line voltage Vsig may be higher than 8V and less than 16V (8V<Vsig<16V) in a period in which the common voltage Vcom becomes 16V. In either of the cases, according to the transparent drive, an absolute value of the difference between the source line voltage Vsig and the common voltage Vcom is less than 8V and the parallelism of the light transmitted through the liquid crystal layer 30 is increased. In other words, the second transparent voltage VA2 is not limited to 0V, but an absolute value of the second transparent voltage VA2 may be less than 8V.

Incidentally, in the transparent drive, the voltage to be applied to the liquid crystal layer 30 may be less than the lower limit (for example, 8V) of the gradation, and the source line voltage Vsig may not completely match the common voltage Vcom. As described above, the degree of scattering in a case where the degree of scattering of the light made incident on the liquid crystal layer 30 is the highest when the scattering voltage VB is applied to the liquid crystal layer 30 is assumed to be 100%. It is desirable that, for example, the second transparent voltage VA2 is a voltage with the degree of scattering in a range lower than 10%.

Figure 10:
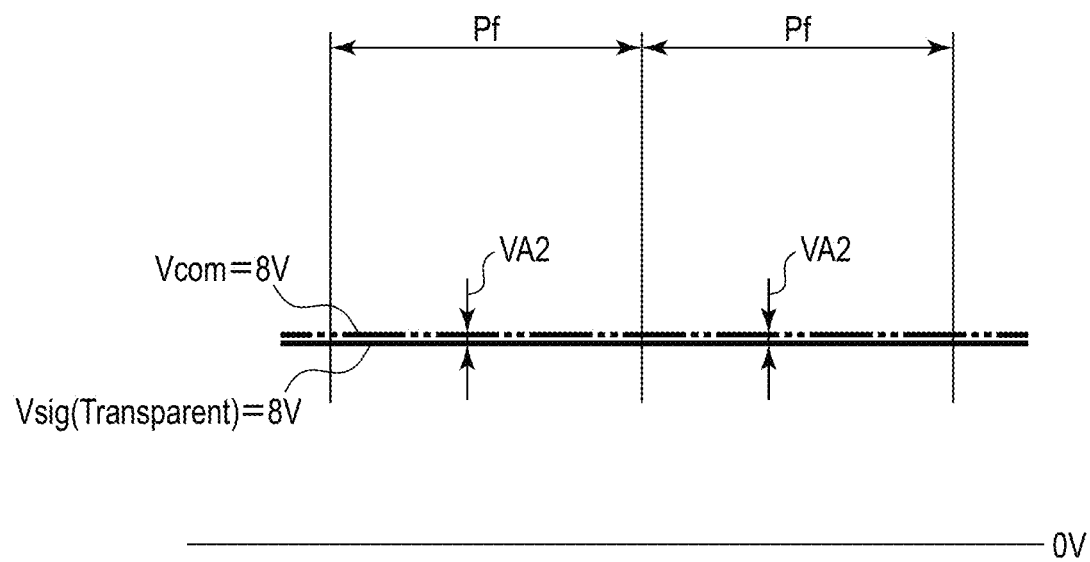
FIG. 10 is a chart showing another example of the common voltage and the source line voltage in the transparent drive.

FIG. 10 is a chart showing another example of the common voltage Vcom and the source line voltage Vsig in the transparent drive. The waveform of the source line voltage Vsig is represented by a solid line, and the waveform of the common voltage Vcom is represented by a two-dot-chain line.

As shown in FIG. 10, in this example, the polarity inversion of the common voltage Vcom and the source line voltage Vsig is stopped in the transparent drive. Furthermore, the common voltage Vcom and the source line voltage Vsig match at 8V (above-described reference voltage Vsig-c). Incidentally, the common voltage Vcom and the source line voltage Vsig may match at a voltage other than the reference voltage Vsig-c, such as 0V. In addition, it is desirable that the second transparent voltage VA2 is a voltage with the degree of scattering in a range lower than 10%, similarly to the case shown in FIG. 9.

The one-line inversion drive scheme has been described above as the example of the transparent drive, but the same transparent drive can also be applied to a line-inversion drive scheme of two or more lines and a frame inversion drive scheme.

Next, a configuration example of the timing controller TC will be described. A drive scheme in which one frame period includes a plurality of sub-frame (field) periods will be applied to the display device DSP. Such a drive scheme is referred to as, for example, a field sequential system. Red, green, and blue images are displayed in the respective sub-frame periods. The images of the colors displayed in time division are mixed and visually recognized as multi-color display image by the user.

Figure 11:
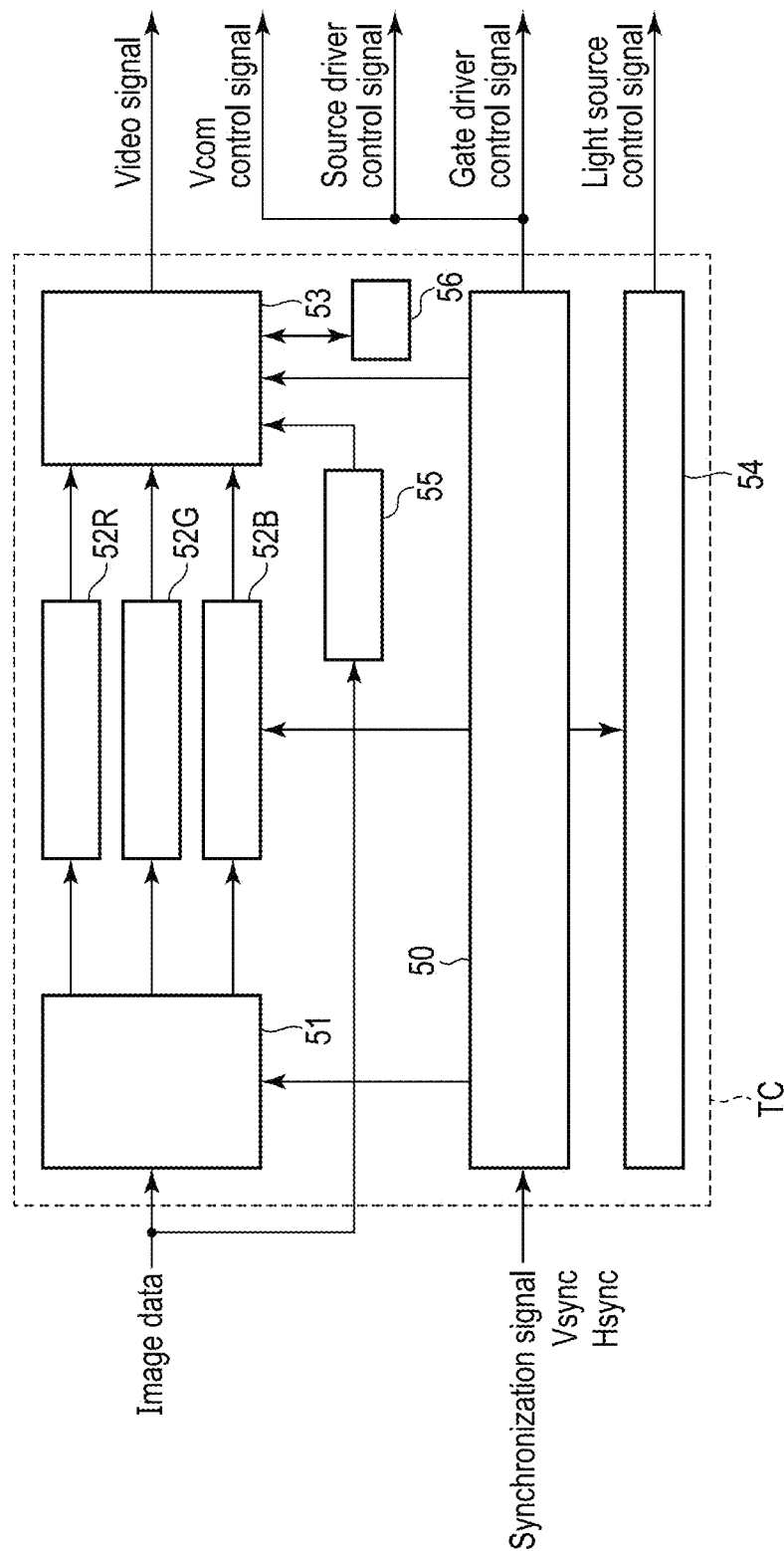
FIG. 11 is a diagram showing a configuration example of the timing controller shown in FIG. 3.

FIG. 11 is a diagram showing a configuration example of the timing controller TC shown in FIG. 3.

As shown in FIG. 11, the timing controller TC comprises a timing generation unit 50, a frame memory 51, line memories 52R, 52G, and 52B, a data conversion unit 53, a light source control unit 54, a detection unit 55 serving as an address detection unit, and the like.

The frame memory 51 stores image data for one frame input from the outside. The line memories 52R, 52G, and 52B store sub-frame data of red, green, and blue colors, respectively. The sub-frame data represent red, green, and blue images (for example, gradation values of the pixels PX) which the pixels PX are urged to display in time division. The sub-frame data of each of the colors stored in the line memories 52R, 52G, and 52B corresponds to a previous frame of the image data stored in the frame memory 51.

The data conversion unit 53 processes the sub-frame data of the colors stored in the line memories 52R, 52G, and 52B by various types of data conversion processing such as gamma correction, generates a video signal, and outputs the video signal to the above-described source driver SD. Incidentally, the timing controller TC may be configured to transmit RGB data to the data conversion unit 53 by allocating the RGB data in the frame memory 51. In this case, the timing controller TC can also be constituted without the line memories 52R, 52G, and 52B.

The light source control unit 54 outputs the light source control signal to the above-described light source driver LSD. The light source driver LSD drives the light emitting elements LSR, LSG, and LSB in accordance with the light source control signal. The light emitting elements LSR, LSG, and LSB can be driven under, for example, pulse width modulation (PWM) control. In other words, the light source driver LSD can adjust the luminance of each of the light emitting elements LSR, LSG, and LSB with the duty ratios of the signals output to the light emitting elements LSR, LSG, and LSB.

The timing generation unit 50 controls the operation timing of the frame memory 51, the line memories 52R, 52G, and 52B, the data conversion unit 53, and the light source control unit 54, in synchronization with a vertical synchronization signal Vsync and a horizontal synchronization signal Hsync that are input from the outside. In addition, the timing generation unit 50 controls the source driver SD by outputting a source driver control signal, controls the gate driver GD by outputting a gate driver control signal, and outputs a Vcom control signal.

The detection unit 55 is configured, when image data for one frame input from the outside includes data of an image, to detect an address of the data of the image. Examples of the image include a character displayed in a part of the display area DA. Examples of the character include a symbol including a letter, a figure, an icon, and the like. In addition, the case where data of the character is included in the image data means a case where data other than 0 is included in at least one piece of all bits of digital data. Address information of the data of the image is supplied to the data conversion unit 53. For this reason, when the image data is included in data of images input from the outside, the timing controller TC adjusts the degree of scattering (transparency) of an area other than the area where the images are displayed, and can generate the processed video signal and output the processed video signal to the source driver SD. When generating the processed video signal, the timing controller TC can perform calculation using the data conversion unit 53 and perform the generation using the data stored in a table 56 of the timing controller TC.

Figure 12:
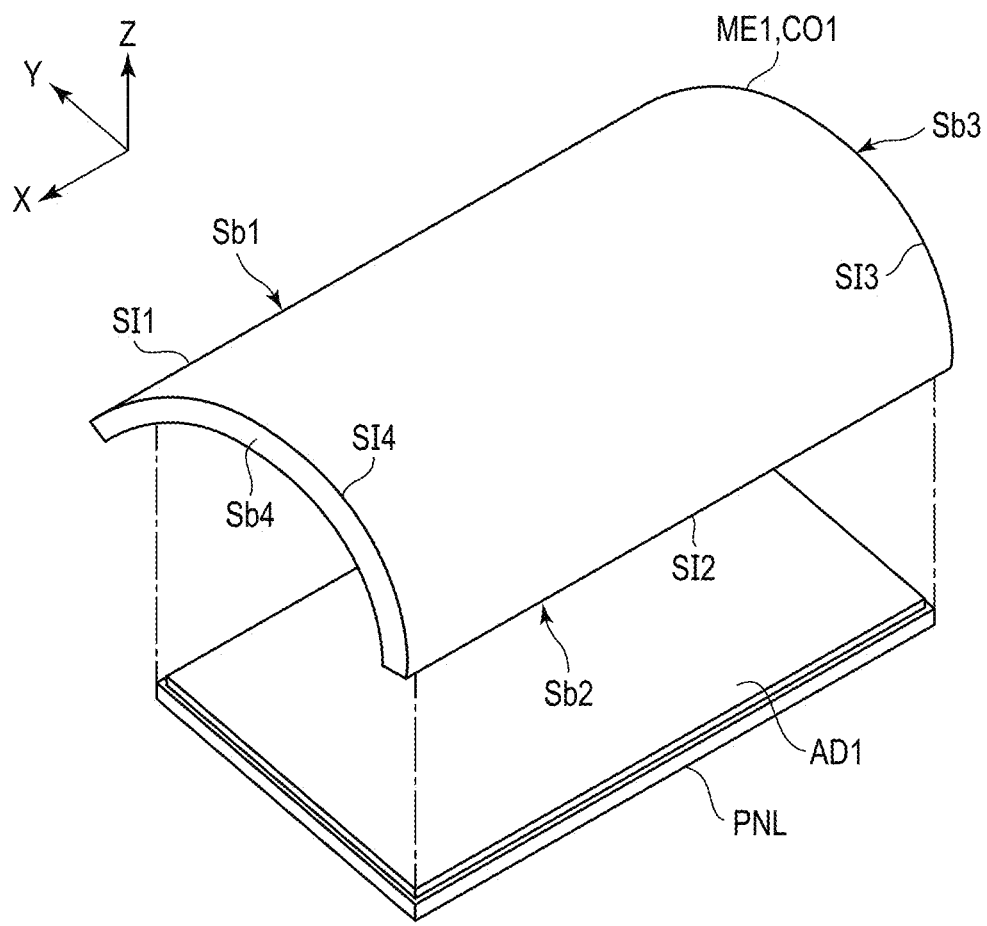
FIG. 12 is an exploded view showing the display panel and the cover panel of the display device, illustrating a state in which the display panel is to be adhered to the cover panel.

Next, a process of adhering the display panel PNL to the cover panel CO1 in the method of manufacturing the display device DSP of the present embodiment will be described. FIG. 12 is an exploded perspective view showing the display panel PNL and the cover panel CO1 of the display device DSP, illustrating a state in which the display panel PNL is to be adhered to the cover panel CO1.

As shown in FIG. 12, the cover panel CO1 is prepared. The first transparent substrate ME1 of the cover panel CO1 is curved. The first transparent substrate ME1 is curved such that the second main surface Sa2 side is convex. However, the first transparent substrate ME1 may be curved such that the first main surface Sa1 side is convex.

The first transparent substrate ME1 further has a side surface Sb3 and a side surface Sb4. Each of the side surfaces Sb1 and Sb2 extends straight. More specifically, the long side Sl1 of the side surface Sb1 and the long side Sl2 of the side surface Sb2 are straight. In contrast, each of the side surfaces Sb3 and Sb4 extends to be curved. More specifically, the long side Sl3 of the side surface Sb3 and the long side Sl4 of the side surface Sb4 are curved. Based on the above, the side surface Sb1 opposed to the light emitting element LS is a non-curved surface. The cross-section of the first transparent substrate ME1 on the Y-Z plane is not curved, but the cross-section of the first transparent substrate ME1 on the X-Z plane is curved.

Then, the display panel PNL is adhered to the cover panel CO1. At this time, the first adhesive sheet AD1 is adhered to one of the display panel PNL and the cover panel CO1. In this example, the first adhesive sheet AD1 is adhered to the display panel PNL. After that, the display panel PNL and the cover panel CO1 are opposed to each other. The display panel PNL is not curved before the display panel PNL is adhered to the cover panel CO1. After that, the display panel PNL is pressed against the cover panel CO1, and the display panel PNL is adhered to the cover panel CO1. The display panel PNL is thereby curved according to the cover panel CO1.

Figure 13:
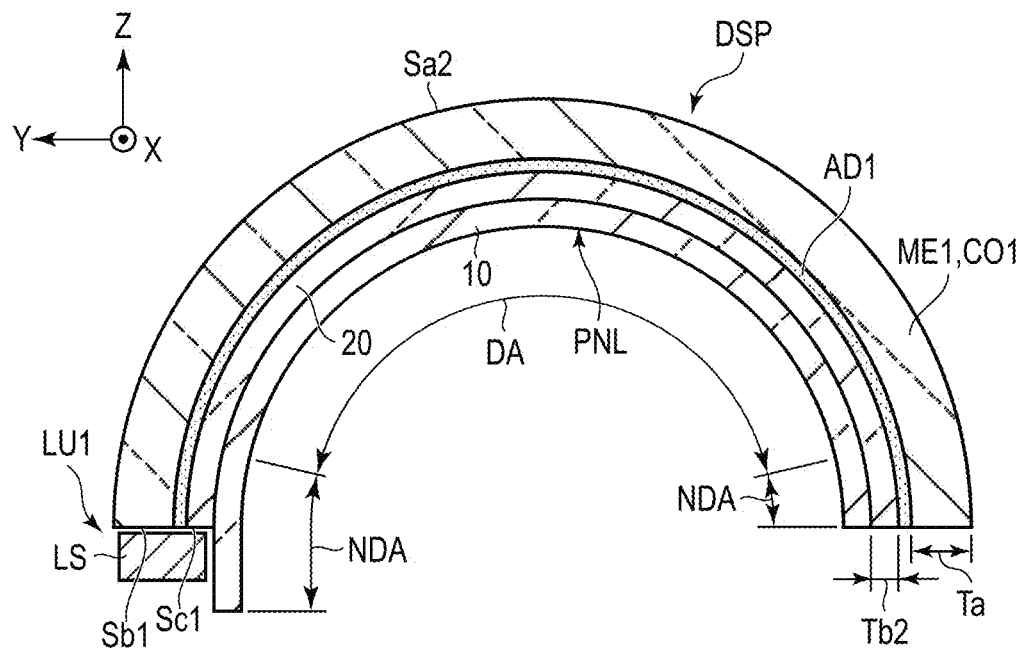
FIG. 13 is a cross-sectional view showing the display device.

FIG. 13 is a cross-sectional view showing the display device DSP of the embodiment. FIG. 13 shows only the first basement 10 and the second basement 20 of the display panel PNL.

As shown in FIG. 13, the cover panel CO1 (first transparent substrate ME1), the first adhesive sheet AD1, and the display panel PNL are curved such that the second main surface Sa2 side is convex, in the cross-section of the display device DSP on a virtual plane parallel to the Y-Z plane.

The light emitting element LS is composed of, for example, a light emitting diode. However, the light emitting element LS may be a laser or a laser diode. In such a case, it is desirable to provide a lens between the light emitting element LS and the side surfaces Sb1 and Sc1, spread the light emitted by the light emitting element LS in the X-Y plane direction, and make the light incident on the side surfaces Sb1 and Sc1.

The light emitting element LS can emit light onto the side surface Sb1 of the first transparent substrate ME1 having the thickness Ta. Since the size of the light emitting element LS opposed to the side surface Sb1 can be increased, the luminance level of the light emitted by the light emitting element LS can be increased in proportion to the above-mentioned size. Therefore, the user can visually recognize the display image of the display device DSP desirably.

In the present embodiment, the side surfaces Sb1 and Sc1 are located on the same plane. In addition, the light emitting element LS is opposed to not only the side surface Sb1 of the first transparent substrate ME1 but also the side surface Sc1 of the second basement 20. The size of the light emitting element LS can be further increased, and the luminance level of the light emitted by the light emitting element LS can be further increased. Therefore, the user can visually recognize the display image of the display device DSP further desirably.

According to the display device DSP of the first embodiment configured as described above, the display device DSP comprises the first transparent substrate ME1, the display panel PNL, the first adhesive sheet AD1, and the first light source unit LU1. When the display panel PNL is flexible, the thicknesses Tb1 and Tb2 become smaller. For example, if light is emitted only on the side surface Sc1 of the second basement 20, the amount of light may be insufficient and the user can hardly visually recognize the image (character) displayed on the display device DSP.

Therefore, the first light source unit LU1 can emit light at a high luminance level to the first transparent substrate ME1 and the like. The user can easily visually recognize the image (character) displayed on the display device DSP. Therefore, the display device DSP capable of increasing the display quality can be obtained. In addition to the above, various suitable advantages can be obtained from the present embodiment.

Modified Example 1 of First Embodiment

Figure 14:
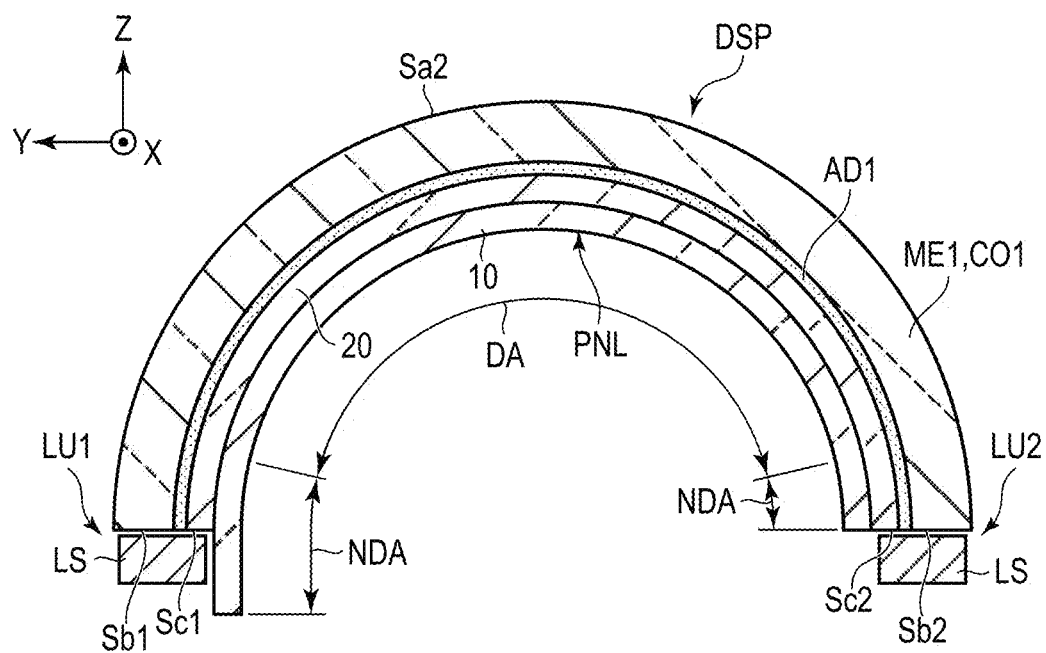
FIG. 14 is a cross-sectional view showing the display device according to modified example 1 of the first embodiment.

Next, modified example 1 of the first embodiment will be described. The display device DSP is configured in the same manner as the display device DSP of the first embodiment except for the configuration described in modified example 1. FIG. 14 is a cross-sectional view showing the display device DSP of modified example 1.

As shown in FIG. 14, the display device DSP further comprises a second light source unit LU2. The second light source unit LU2 comprises a light emitting element LS and the like. The side surface Sb2 of the first transparent substrate ME1 is a second light incident surface on a side opposite to the side surface (first light incident surface) Sb1. The second basement 20 has the side surface Sc2 on a side opposite to the side surface Sc1.

The light emitting element LS of the second light source unit LU2 is composed of a light emitting diode. The light emitting element LS has a light emitting portion (light emitting surface) that is opposed to the side surface Sb2 to emit light to the side surface Sb2. In modified example 1, the light emitting element LS is also opposed to the side surface Sc2 of the second basement 20. The illumination light emitted from the light emitting element LS is also made incident on the side surface Sc2.

The light emitting element LS of the second light source unit LU2 can emit the light to the side surface Sb2 of the first transparent substrate ME1. Since the size of the light emitting element LS opposed to the side surface Sb2 can be increased, the luminance level of the light emitted by the light emitting element LS can be increased in proportion to the above-mentioned size. Therefore, the user can visually recognize the display image of the display device DSP desirably.

In modified example 1, the side surfaces Sb2 and Sc2 are located on the same plane. In addition, the light emitting element LS of the second light source unit LU2 is opposed to not only the side surface Sb2 of the first transparent substrate ME1 but also the side surface Sc2 of the second basement 20. The size of the light emitting element LS of the second light source unit LU2 can be further increased, and the luminance level of the light emitted by the light emitting element LS of the second light source unit LU2 can be further increased. Therefore, the user can visually recognize the display image of the display device DSP further desirably.

In modified example 1, the same advantages as the above-described first embodiment can also be obtained. Furthermore, in modified example 1, light can be emitted to both side surfaces of the first transparent substrate ME1. Therefore, the user can visually recognize the display image of the display device DSP further desirably.

Modified Example 2 of First Embodiment

Next, modified example 2 of the first embodiment will be described. The display device DSP is configured in the same manner as the display device DSP of the first embodiment except for the configuration described in modified example 2. FIG. 15 is a cross-sectional view showing the display device DSP of modified example 2.

As shown in FIG. 15, the side surface Sb1 of the first transparent substrate ME1 and the side surface Sc1 of the second basement 20 are not located on the same plane. In modified example 2, side surface Sb1 is located more closely to the display area DA side than the side surface Sc1. The light emitting element LS of the first light source unit LU1 is opposed to the side surface Sb1 of the first transparent substrate ME1, but is not opposed to the side surface Sc1 of the second basement 20.

The light emitting element LS of the first light source unit LU1 can emit light to the side surface Sb1 of the first transparent substrate ME1. The luminance level of the light emitted by the light emitting element LS can be made higher as compared to the case where light is emitted to the only side surface Sc1 of the second basement 20. Therefore, the user can visually recognize the display image of the display device DSP desirably. In modified example 2, the same advantages as the above-described first embodiment can also be obtained.

Modified Example 3 of First Embodiment

Next, modified example 3 of the first embodiment will be described. The display device DSP is configured in the same manner as the display device DSP of the first embodiment except for the configuration described in modified example 3. FIG. 16 is a cross-sectional view showing the display device DSP of modified example 3.

As shown in FIG. 16, the display device DSP comprises a cover panel CO2. The cover panel CO2 comprises a second transparent substrate ME2. The second transparent substrate ME2 is a cover glass and is formed of glass. The second transparent substrate ME2 is a non-flexible substrate. The second transparent substrate ME2 overlaps with at least the entire display area DA.

The second transparent substrate ME2 has a third main surface Sa3, a fourth main surface Sa4, a side surface Sd1, and a side surface Sd2. The third main surface Sa3 is opposed to the display panel PNL. The fourth main surface Sa4 is located on a side opposite to the third main surface Sa3. The side surface Sd1 is located between the third main surface Sa3 and the fourth main surface Sa4. The side surface Sd2 is located between the third main surface Sa3 and the fourth main surface Sa4 and is located on a side opposite to the side surface Sd1. The side surface Sd2 is a third light incident surface. In modified example 3, the side surfaces Sd1 and Sd2 are located in the non-display area NDA. The display panel PNL is sandwiched between the second transparent substrate ME2 and the first transparent substrate ME1, and the second transparent substrate ME2 is curved in accordance with the first transparent substrate ME1.

The second adhesive sheet AD2 (also referred to as a second fixing member) is located between the second transparent substrate ME2 and the display panel PNL, and adheres the display panel PNL to the second transparent substrate ME2. The second adhesive sheet AD2 contacts and sticks to the second transparent substrate ME2 on one side and contacts and sticks to the display panel PNL on the other side. The second adhesive sheet AD2 overlaps with at least the entire display area DA. The second adhesive sheet AD2 is formed of OCA, but may be formed of a material other than OCA.

The first basement 10 has a side surface Se1 located more closely to the side surface Sd1 side than the display area DA and a side surface Se2 located more closely to the side surface Sd2 side than the display area DA. In the first basement 10, the side surface Se2 is located on the side opposite to the side surface Se1.

The display device DSP comprises a second light source unit LU2. The second light source unit LU2 is located in the non-display area NDA. The second light source unit LU2 comprises a light emitting element LS and the like. The light emitting element LS of the second light source unit LU2 is composed of a light emitting diode. The light emitting element LS has a light emitting portion (light emitting surface) that is opposed to the side surface Sd2 to emit light to the side surface Sd2.

Illumination light emitted from the light emitting element LS is made incident on the side surface Sd2 and propagates through the second transparent substrate ME2 (cover panel CO2), the second adhesive sheet AD2, the display panel PNL, the first adhesive sheet AD1, and the first transparent substrate ME1 (cover panel CO1). In modified example 3, the light emitting element LS of the second light source unit LU2 is also opposed to the side surface Se2 of the first basement 10. Illumination light emitted from the light emitting element LS of the second light source unit LU2 is also made incident on the side surface Se2.

Similarly to modified example 3, the display panel PNL is sandwiched between the first transparent substrate ME1 and the second transparent substrate ME2. Not only the first transparent substrate ME1 but also the second transparent substrate ME2 can function as a light guide.

The light emitting element LS of the second light source unit LU2 can emit light to the side surface Sd2 of the second transparent substrate ME2. Since the size of the light emitting element LS opposed to the side surface Sd2 can be increased, the luminance level of the light irradiated by the light emitting element LS can be increased in proportion to the above size.

In modified example 3, the side surfaces Sd2 and Se2 are located on the same plane. In addition, the light emitting element LS of the second light source unit LU2 is opposed to not only the side surface Sd2 of the second transparent substrate ME2 but also the side surface Se2 of the first basement 10. The size of the light emitting element LS of the second light source unit LU2 can be further increased, and the luminance level of the light emitted by the light emitting element LS of the second light source unit LU2 can be further increased. Therefore, the user can visually recognize the display image of the display device DSP further desirably. In modified example 3, the same advantages as the above-described first embodiment can also be obtained.

Incidentally, in modified example 3, the side surfaces Sd2, Se2, Sc2, and Sb2 are located on the same plane. Therefore, the light emitting element LS of the second light source unit LU2 may be opposed to the side surface Sd2, the side surface Se2, the side surface Sc2, and the side surface Sb2. The size of the light emitting element LS of the second light source unit LU2 can be further increased. In this case, the display device DSP may comprise a first light source unit LU1 as needed.

Second Embodiment

Figure 17:
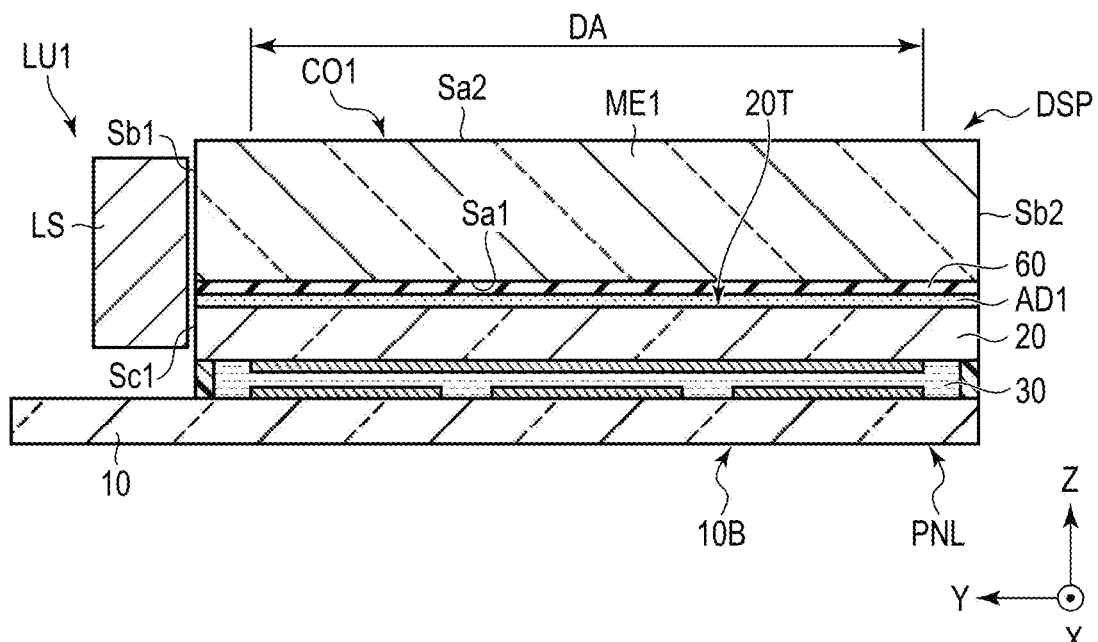
FIG. 17 is a developed cross-sectional view showing a display device of a second embodiment.
Figure 18:
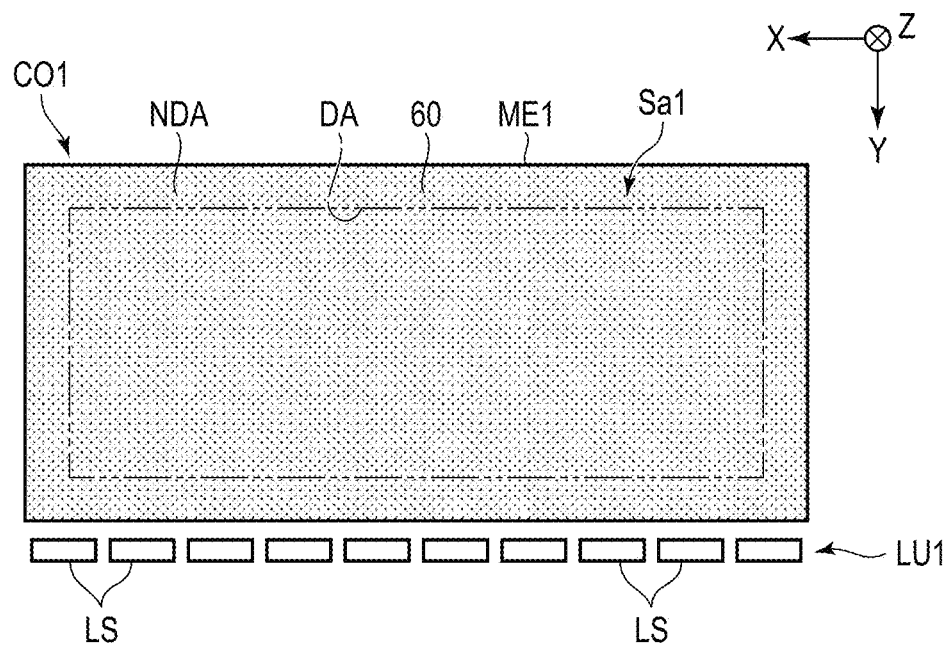
FIG. 18 is a plan view showing a cover panel and a first light source unit of the second embodiment, developing the cover panel.

Next, a second embodiment will be described. The display device DSP is configured in the same manner as the display device DSP of the first embodiment except for the configuration described in the second embodiment. FIG. 17 is a developed cross-sectional view showing the display device DSP of the second embodiment. FIG. 18 is a plan view showing a cover panel CO1 and a first light source unit LU1 of the second embodiment, developing the cover panel CO1. In FIG. 18, a part with a dot pattern is an optical layer 60. Incidentally, an actual first transparent substrate ME1, a display panel PNL, and the like are curved.

As shown in FIG. 17, the display device DSP further comprises an optical layer 60, which is a transparent layer. The optical layer 60 is located between the first transparent substrate ME1 and the display panel PNL. The optical layer 60 is in contact with a first main surface Sa1 of the first transparent substrate ME1. In the present embodiment, a cover panel CO1 comprises the first transparent substrate ME1 and the optical layer 60.

As shown in FIG. 17 and FIG. 18, the optical layer 60 is in contact with the entire first main surface Sa1. In plan view, the optical layer 60 overlaps with the entire display area DA and the entire non-display area NDA. The optical layer 60 is formed of an organic material such as siloxane-based resin or fluorine-based resin. The refractive index of the optical layer 60 is substantially 1.0 to 1.4.

Each of a second basement 20 and the first transparent substrate ME1 of the display panel PNL is formed of glass. The refractive index of each of the second basement 20 and the first transparent substrate ME1 is 1.51. For this reason, the refractive index of the optical layer 60 is lower than that of the second basement 20. Furthermore, the refractive index of the optical layer 60 is lower than the refractive index of the first transparent substrate ME1.

In the display device DSP of the second embodiment configured as described above, the same advantages as those of the first embodiment can be obtained, and the display device DSP capable of improving the display quality can be obtained. The first transparent substrate ME1 and the optical layer 60 can desirably propagate light made incident from the side surface Sb1 to the side surface Sb2 side inside the first transparent substrate ME1. By providing the optical layer 60 in the display device DSP, light components that pass from the first transparent substrate ME1 to an upper surface 20T of the second basement 20 can be suppressed. Therefore, the situation in which the brightness of the image displayed by the display device DSP is different on the side surface Sb1 side and the side surface Sb2 side can be suppressed. The optical layer 60 may be formed as a solid film or as a dotted film. Furthermore, the light emitted by the light emitting elements LS is desirably made more incident on the side surface Sb1 and less incident on the side surface Sb2. The light emitted by the light emitting elements LS may be made incident on an entire side surface Sb1 or a substantially entire side surface Sb1. The light emitting elements LS or the light emitting portions of the light emitting elements LS may be configured such that the area opposed to the side surface Sb1 is larger than the area opposed to the side surface Sb2. The light emitting elements LS or the light emitting portions of the light emitting elements LS may be configured to be opposed to the side surface Sb1 and not to be opposed to the side surface Sb2.

Unlike the above-described second embodiment, the first adhesive sheet AD1 may have the function of the optical layer 60. In this case, the display device DSP is formed without the optical layer 60. When the first adhesive sheet AD1 has the function of the optical layer 60, the refractive index of the first adhesive sheet AD1 is 1.41 to 1.48. For this reason, the refractive index of the first adhesive sheet AD1 is lower than that of the second basement 20. Furthermore, the refractive index of the first adhesive sheet AD1 is lower than that of the first transparent substrate ME1.

Modified Example 1 of Second Embodiment

Next, modified example 1 of the second embodiment will be described. The display device DSP is configured in the same manner as the display device DSP of the second embodiment except for the configuration described in modified example 1. FIG. 19 is a plan view showing the cover panel CO1 and the first light source unit LU1 of modified example 1, developing the cover panel CO1. In FIG. 19, a part with a dot pattern is the optical layer 60.

As shown in FIG. 19, the first main surface Sa1 of the first transparent substrate ME1 has one or more contact areas CA, and a non-contact area NCA other than the one or more contact areas CA. The optical layer 60 is in contact with the entire one or more contact areas CA. The optical layer 60 is in contact with a part of the first main surface Sa1. The proportion of the area of the one or more contact areas CA on the first main surface Sa1 is larger toward the side surface Sb1. In other words, the optical layer 60 is patterned as represented in the dot pattern.

The optical layer 60 comprises a plurality of band portions 61 and a frame portion 62 surrounding the plurality of band portions 61. The frame portion 62 is located in the non-display area NDA. The band portions 61 and the frame portion 62 are formed integrally. Each of the band portions 61 includes a first end portion 611 on the side opposite to the light emitting element LS, a second end portion 612 on the side opposite to the first end portion 611, a first edge 613, and a second edge 614. A width of the first end portion 611 is greater than a width of the second end portion 612 in the first direction X.

The first edge 613 and the second edge 614 extend in a direction different from the first direction X and the second direction Y, at positions between the first end portion 611 and the second end portion 612. A direction that intersects the second direction Y clockwise at an acute angle is defined as a direction D1, and a direction that intersects the second direction Y counterclockwise at an acute angle is defined as a direction D2. The first edge 613 extends in the direction D1, and the second edge 614 extends in the direction D2. In this example, each of the band portions 61 is formed in a triangular shape, and both the first edge 613 and the second edge 614 extend straight. However, the shape of the band portion 61 is not limited to a triangular shape. For example, each of the first edge 613 and the second edge 614 may be formed in a curved shape.

In modified example 1, the same advantages as the above-described second embodiment can also be obtained. Furthermore, in the display area DA, the proportion of the area in which the optical layer 60 is formed is larger toward the side surface Sb1. As the distance to the side surface Sb1 is shorter, it is more difficult for light to escape from the first transparent substrate ME1 to the upper surface 20T of the second basement 20. In contrast, as the distance to the side surface Sb2 is shorter, it is easier for light to escape from the first transparent substrate ME1 to the upper surface 20T of the second basement 20. For this reason, the situation in which the brightness of the image displayed by the display device DSP is different on the side surface Sb1 side and the side surface Sb2 side can be further suppressed.

The first edge 613 and the second edge 614 are not parallel to the first direction X. Therefore, scattering of light at the first edge 613 and the second edge 614 can be suppressed.

Modified Example 2 of Second Embodiment

Next, modified example 2 of the second embodiment will be described. The display device DSP is configured in the same manner as the display device DSP of modified example 1 of the second embodiment except for the configuration described in modified example 2. FIG. 20 is a plan view showing the cover panel CO1, the first light source unit LU1, and the second light source unit LU2 of modified example 2, developing the cover panel CO1. In FIG. 20, a part with a dot pattern is the optical layer 60.

As shown in FIG. 20, the display device DSP comprises a second light source unit LU2. The first light source unit LU1 and the second light source unit LU2 can emit light to the first transparent substrate ME1 from both sides. Each of the band portions 61 includes a middle portion 615 in the second direction Y. The width of each of the band portions 61 is reduced at the middle portion 615. The width of the first end portion 611 is greater than the width of the middle portion 615, and the width of the second end portion 612 is greater than the width of the middle portion 615, in the first direction X. The width of the band portion 61 is reduced gradually from the first end portion 611 toward the middle portion 615. In addition, the width of the band portion 61 is reduced gradually from the second end portion 612 toward the middle portion 615.

In modified example 2, the same advantages as the above-described modified example 1 of the second embodiment can also be obtained. Furthermore, by reducing the width of the band portion 61 at the middle portion 615, more light can reach the center of the display area DA of the display panel PNL when the light is emitted on both sides of the first transparent substrate ME1. Therefore, the reduction in the luminance level in the center of the display device DSP can be suppressed.

Third Embodiment

Figure 21:
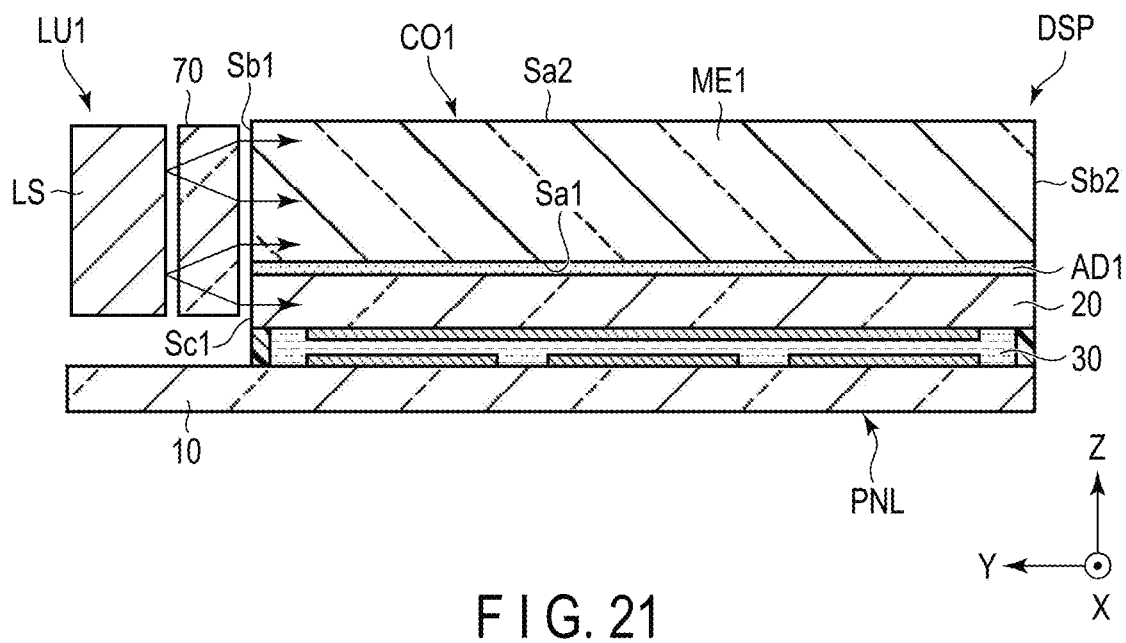
FIG. 21 is a developed cross-sectional view showing a display device of a third embodiment.
Figure 22:
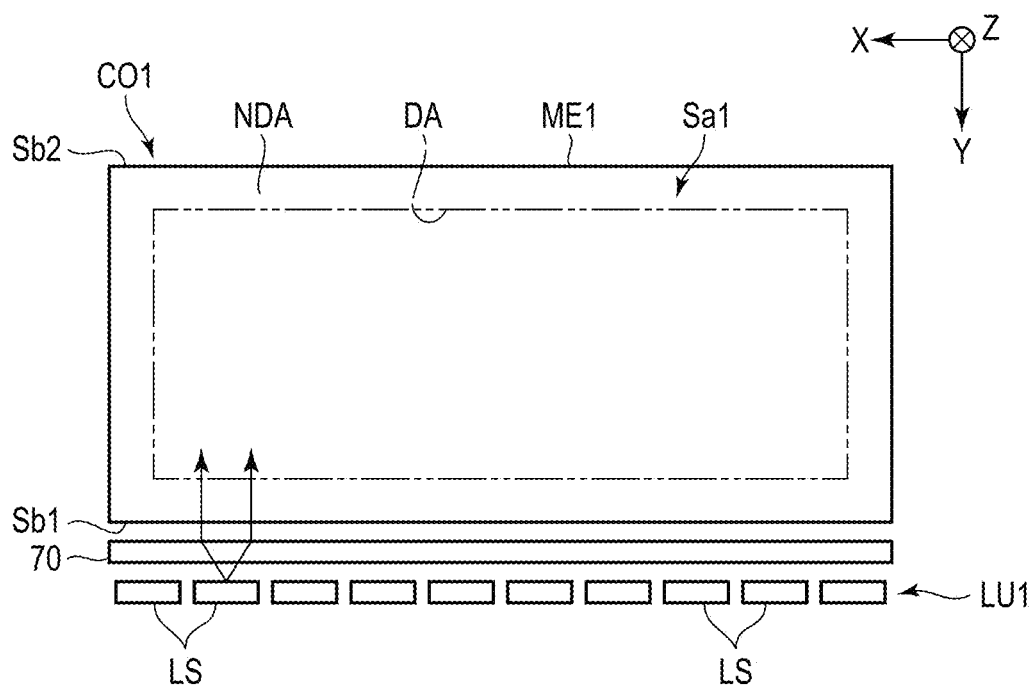
FIG. 22 is a plan view showing a cover panel, a first light source unit, and an optical member of the display device of the third embodiment, developing the cover panel.

Next, a third embodiment will be described. The display device DSP is configured in the same manner as the display device DSP of the first embodiment except for the configuration described in the third embodiment. FIG. 21 is a developed cross-sectional view showing the display device DSP of the third embodiment. FIG. 22 is a plan view showing a cover panel CO1, a first light source unit LU1, and an optical member 70 of the display device DSP of the third embodiment, developing the cover panel CO1. Incidentally, an actual first transparent substrate ME1, a display panel PNL, and the like are curved. FIG. 23 is a perspective view showing a part of the optical member 70 of the third embodiment.

As shown in FIG. 21 and FIG. 22, the display device DSP further comprises the optical member 70. The optical member 70 extends in the first direction X and is located between the side surface Sb1 of the first transparent substrate ME1 and the first light source unit LU1 (light emitting elements LS). The light emitting elements LS emit light toward the optical member 70. The optical member 70 has a function of focusing the light made incident from the first light source unit LU1 and transmitting the light to the side surface Sb1 side. The optical member 70 can increase the components of the light traveling in a direction parallel to the second direction Y and transmit the light to the side surface Sb1, in the Y-Z plane. The optical member 70 can also limit the light in the thickness direction (third direction Z). For example, the light made incident on the first transparent substrate ME1 can hardly leak outward from the second main surface Sa2. Therefore, the light can desirably propagate to the side surface Sb2 side inside the first transparent substrate ME1.

In the present embodiment, the optical member 70 is also located between the side surface Sc1 of the second basement 20 and the first light source unit LU1 (light emitting elements LS). The optical member 70 can also focus the light made incident from the first light source unit LU1 and transmit the light to the side surface Sc1 side.

As shown in FIG. 23, the optical member 70 is a microlens array including a plurality of arrayed microlenses 71 and a plate-shaped transparent layer 72. The plurality of microlenses 71 and the transparent layer 72 are formed integrally. Each of the microlenses 71 is raised so as to be convex on the side surface Sb1 side or the side surface Sc1 side. In plan view in which the optical member 70 is viewed from the side surface Sb1 side, the shape of the microlens 71 is a quadrangular shape. In plan view, however, the shape of the microlens 71 may be a polygon other than a quadrangle, such as a hexagon, or may be a circle.

In the display device DSP of the third embodiment configured as described above, the same advantages as those of the first embodiment can be obtained, and the display device DSP capable of improving the display quality can be obtained. The components of the light made incident perpendicularly on the side surfaces Sb1 and Sc1 can be increased by providing the optical layer 70. The light emitted by the light emitting elements LS can be efficiently input (transmitted) to the inside of the first transparent substrate ME1 and the inside of the second basement 20. Therefore, the user can visually recognize the display image of the display device DSP further desirably. Alternatively, the power consumption of the light source unit LU1 can be reduced. Incidentally, the optical member 70 may be a lenticular lens.

Fourth Embodiment

Figure 25:
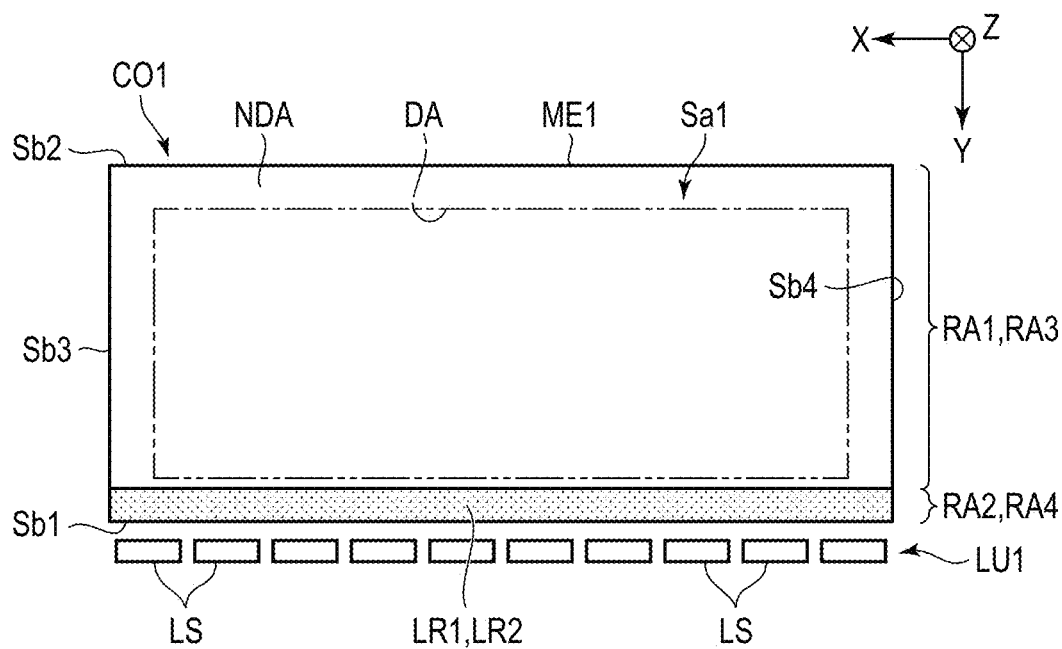
FIG. 25 is a plan view showing a cover panel and a first light source unit of the fourth embodiment, developing the cover panel.

Next, a fourth embodiment will be described. The display device DSP is configured in the same manner as the display device DSP of the first embodiment except for the configuration described in the fourth embodiment. FIG. 24 is a developed cross-sectional view showing the display device DSP of the fourth embodiment. FIG. 25 is a plan view showing a cover panel CO1 and a first light source unit LU1 of the fourth embodiment, developing the cover panel CO1. Incidentally, an actual first transparent substrate ME1, a display panel PNL, and the like are curved.

As shown in FIG. 24 and FIG. 25, the display device DSP further comprises a first light reflective layer LR1 and a second light reflective layer LR2. In the present embodiment, the cover panel CO1 comprises the first transparent substrate ME1, the first light reflective layer LR1, and the second light reflective layer LR2. A first main surface Sa1 of the first transparent substrate ME1 has a first reflective area RA1 and a second reflective area RA2 located more closely to the side surface Sb1 side than the first reflective area RA1. A second main surface Sa2 of the transparent substrate ME1 has a third reflective area RA3 and a fourth reflective area RA4 located more closely to the side surface Sb1 side than the third reflective area RA3. Each of the second reflective area RA2 and the fourth reflective area RA4 does not overlap with the display area DA.

The first light reflective layer LR1 is opposed to the second reflective area RA2 of the first main surface Sa1 and is not opposed to the first reflective area RA1. The first light reflective layer LR1 can reflect light that could leak from the second reflective area RA2 to the outside of the first transparent substrate ME1 and return the light to the inside of the first transparent substrate ME1. The second light reflective layer LR2 is opposed to the fourth reflective area RA4 of the second main surface Sa2 and is not opposed to the third reflective area RA3. The second light reflective layer LR2 can reflect light that could leak from the fourth reflective area RA4 to the outside of the first transparent substrate ME1 and return the light to the inside of the first transparent substrate ME1.

In the display device DSP of the fourth embodiment configured as described above, the same advantages as those of the first embodiment can be obtained, and the display device DSP capable of improving the display quality can be obtained. The first light reflective layer LR1 and the second light reflective layer LR2 can suppress the generation of light that does not propagate inside the first transparent substrate ME1. Therefore, the user can visually recognize the display image of the display device DSP further desirably. Alternatively, the power consumption of the light source unit LU1 can be reduced.

Fifth Embodiment

Figure 26:
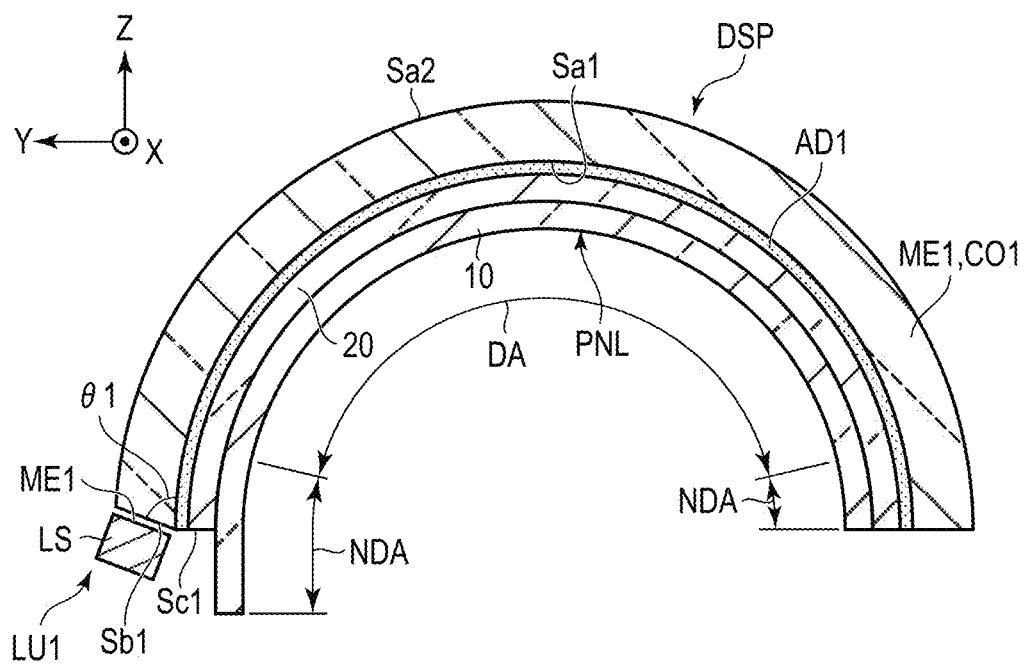
FIG. 26 is a cross-sectional view showing a display device of a fifth embodiment.

Next, a fifth embodiment will be described. The display device DSP is configured in the same manner as the display device DSP of the first embodiment except for the configuration described in the fifth embodiment. FIG. 26 is a cross-sectional view showing the display device DSP of the fifth embodiment.

As shown in FIG. 26, an angle $\theta 1$ between the first main surface Sa1 and the side surface Sb1 is an angle other than 90 degrees. The side surface Sb1 and the angle $\theta 1$ are adjusted by performing polishing (mechanical polishing) on the first transparent substrate ME1. The light emitting element LS (light emitting portion EM) is opposite to the side surface Sb1.

In the present embodiment, the angle $\theta 1$ is an acute angle, but may be an obtuse angle. In the present embodiment, however, the angle $\theta 1$ is desirably an acute angle. This is because the first transparent substrate ME1 is curved such that the second main surface Sa2 side is convex and because the light made incident on the first transparent substrate ME1 is difficult to leak outward from the second main surface Sa2.

In the display device DSP of the fifth embodiment configured as described above, the same advantages as those of the first embodiment can be obtained, and the display device DSP capable of improving the display quality can be obtained. Since the angle $\theta 1$ is an angle other than 90 degrees, the light input efficiency to the display area DA of the display panel PNL can be increased. Therefore, the user can visually recognize the display image of the display device DSP further desirably. Alternatively, the power consumption of the light source unit LU1 can be reduced.

Sixth Embodiment

Figure 27:
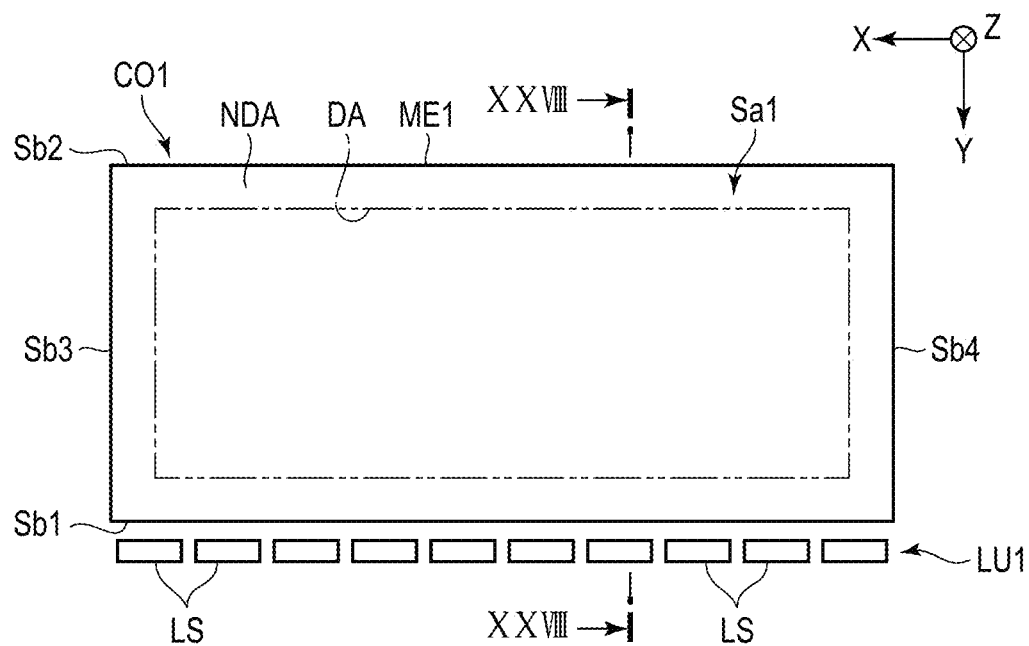
FIG. 27 is a plan view showing a cover panel and a first light source unit of a display device of a sixth embodiment, developing the cover panel.
Figure 28:
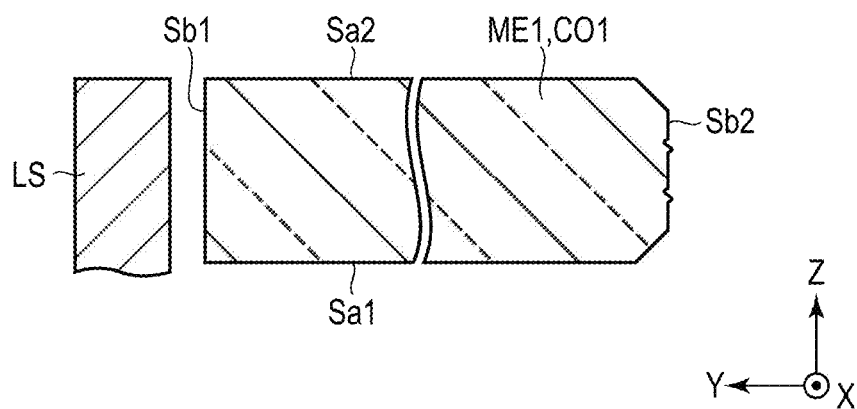
FIG. 28 is a cross-sectional view showing the cover panel and the light emitting element along line XXVIII-XXVIII in FIG. 27.

Next, a sixth embodiment will be described. The display device DSP is configured in the same manner as the display device DSP of the first embodiment except for the configuration described in the sixth embodiment. FIG. 27 is a plan view showing a cover panel CO1 and a first light source unit LU1 of the display device DSP of the sixth embodiment, developing the cover panel CO1. FIG. 28 is a cross-sectional view showing the cover panel CO1 and the light emitting element LS along line XXVIII-XXVIII in FIG. 27. Incidentally, an actual first transparent substrate ME1, and the like are curved.

As shown in FIG. 27 and FIG. 28, the side surface Sb1 that is a first light incident surface, is a surface obtained by drawing a scribe line on the glass substrate and breaking the glass substrate. The side surface Sb1 is a flat surface. The corners of the first transparent substrate ME1 on the side surface Sb1 side are not chamfered. In addition, the side surface Sb1 is not polished. Since the light emitting element LS emits light to the side surface Sb1, the first transparent substrate ME1 can desirably propagate the light inside. For example, since the light made incident on the second main surface Sa2 satisfies the condition for total reflection, the light made incident on the first transparent substrate ME1 can hardly leak outward from the second main surface Sa2.

Incidentally, if the corners of the side surface Sb1 of the first transparent substrate ME1 are chamfered or the side surface Sb1 is polished, the first transparent substrate ME1 can hardly propagate the light inside desirably. For example, since the light made incident on the second main surface Sa2 includes components of the light made incident on the second main surface Sa2 at an angle close to 90 degrees, the light made incident on the first transparent substrate ME1 can easily leak outward from the second main surface Sa2.

In contrast, the side surfaces Sb2, Sb3, and Sb4 are different from the side surface Sb1. The configurations of the respective side surfaces Sb2, Sb3, and Sb4 are the same as each other. In this example, the side surface Sb2 represents the side surfaces Sb2, Sb3, and Sb4.

To obtain the side surface Sb2, first, scribe lines are drawn on the glass substrate and the glass substrate is broken. After that, the corners of the first transparent substrate ME1 on the side surface Sb2 side are chamfered. In addition, the side surface Sb2 is polished. Since unevenness is formed on the side surface Sb2, the side surface Sb2 is not flatter than the side surface Sb1.

In the display device DSP of the sixth embodiment configured as described above, the same advantages as those of the first embodiment can be obtained, and the display device DSP capable of improving the display quality can be obtained. Since the side surface Sb1 that is the first light incident surface is a flat surface, the light input efficiency to the display area DA of the display panel PNL can be increased. Therefore, the user can visually recognize the display image of the display device DSP further desirably. Alternatively, the power consumption of the light source unit LU1 can be reduced.

The side surfaces Sb2, Sb3, and Sb4 of the first transparent substrate ME1 are chamfered and polished. Therefore, the occurrence of chipping due to handling during manufacturing the cover panel CO1 or assembling a module using the cover panel CO1 can be suppressed or prevented.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Two or more of a plurality of embodiments and a plurality of modified examples can also be combined as needed.

The first, second, and third colors are not limited to red, blue, and green colors, respectively. In addition, the light source unit LU may comprise the light emitting elements LS of two or less colors or the light emitting elements LS of four or more colors. Alternatively, the light source unit LU may comprise a light emitting element LS of white color. The number of line memories, the number of items of the sub-frame data, and the number of the sub-frame periods may be increased or reduced in accordance with the number of types (number of colors) of the light emitting elements LS.

The liquid crystal layer 30 may use normal polymer dispersed liquid crystal. The liquid crystal layer 30 maintains the parallelism of the light made incident when the applied voltage is high or scatters the incident light when the applied voltage is low.

Each of the first basement 10 and the second basement 20 of the display panel PNL may be formed of resin. In this case, each of the first basement 10 and the second basement 20 is desirably formed of an amorphous resin. One of examples of the amorphous resin is a cyclo-olefin polymer (COP). By forming the first basement 10 and the second basement 20 of amorphous resin, scattering of light inside each of the first basement 10 and the second basement 20 can be suppressed and the light can be guided desirably.

Incidentally, each of the first basement 10 and the second basement 20 may be formed of a crystalline resin. One of examples of a crystalline resin is polyethylene terephthalate (PET).

What is claimed is:
1. A display device comprising:
a first transparent substrate having a first main surface, a second main surface on a side opposite to the first main surface, and a first light incident surface which is a side surface located between the first main surface and the second main surface, and being formed to be curved;
a display panel having a display area where an image is displayed and external light is transmitted, being opposed to the first main surface of the first transparent substrate, and having flexibility;
a first fixing member located between the first transparent substrate and the display panel and fixing the display panel to the first transparent substrate;
a first light source unit opposed to the first light incident surface of the first transparent substrate and emitting light to the first light incident surface;
a first light reflective layer; and
a second light reflective layer,
wherein
the first main surface of the first transparent substrate has a first reflective area and a second reflective area located more closely to the first light incident surface side than the first reflective area,
the second main surface of the first transparent substrate has a third reflective area and a fourth reflective area located more closely to the first light incident surface side than the third reflective area,
each of the second reflective area and the fourth reflective area does not overlap with the display area,
the first light reflective layer is opposed to the second reflective area of the first main surface, and
the second light reflective layer is opposed to the fourth reflective area of the second main surface.
2. The display device of claim 1, further comprising:
a second light source unit, wherein
the first transparent substrate further has a second light incident surface which is a side surface located between the first main surface and the second main surface, and is opposite to the first light incident surface, and
the second light source unit is opposed to the second light incident surface of the first transparent substrate and emits light to the second light incident surface.
3. The display device of claim 1, wherein
a long side of the first light incident surface is straight.
4. The display device of claim 1, wherein
a thickness of the first transparent substrate is greater than a thickness of the display panel.
5. The display device of claim 1, further comprising:
a second transparent substrate having a third main surface opposed to the display panel, a fourth main surface on a side opposite to the third main surface, and a third light incident surface which is a side surface located between the third main surface and the fourth main surface, the display panel being sandwiched between the first transparent substrate and the second transparent substrate, the second transparent substrate being formed to be curved along the first transparent substrate;
a second fixing member located between the second transparent substrate and the display panel and fixing the display panel to the second transparent substrate; and
a second light source unit opposed to the third light incident surface of the second transparent substrate and emitting light to the third light incident surface.
6. The display device of claim 1, further comprising:
an optical layer located between the first transparent substrate and the display panel, wherein
the display panel further includes a first basement, a second basement located between the first basement and the first transparent substrate, and a liquid crystal layer located between the first basement and the second basement and containing streaky polymer and liquid crystal molecules, and a refractive index of the optical layer is lower than a refractive index of the second basement.

7. The display device of claim 6, wherein
the optical layer is in contact with the first main surface of the first transparent substrate.

8. The display device of claim 7, wherein
the optical layer is in contact with an entire body of the first main surface.

9. The display device of claim 7, wherein
the first main surface has one or more contact areas, and a non-contact area other than the one or more contact areas, and
the optical layer is in contact with an entire body of the one or more contact areas.

10. The display device of claim 9, wherein
a proportion of area of the one or more contact areas in the first main surface is greater toward the first light incident surface.

11. The display device of claim 1, further comprising:
an optical layer located between the first transparent substrate and the display panel, wherein
a refractive index of the optical layer is lower than a refractive index of the first transparent substrate.

12. The display device of claim 1, further comprising:
an optical member located between the first light incident surface of the first transparent substrate and the first light source unit, focusing light made incident from the first light source unit and transmitting light to the first light incident surface side.

13. The display device of claim 12, wherein
the optical member is a microlens array including a plurality of arrayed microlenses.

14. The display device of claim 1, wherein
an angle between the first main surface and the first light incident surface is an angle other than 90 degrees.

15. The display device of claim 1, wherein
the display panel further includes a first basement, a second basement located between the first basement and the first transparent substrate, and a liquid crystal layer located between the first basement and the second basement and containing streaky polymer and liquid crystal molecules, and
a thickness of each of the first basement and the second basement is 0.2 mm or less.

16. The display device of claim 1, wherein
the display panel further includes a first basement, a second basement located between the first basement and the first transparent substrate, and a liquid crystal layer located between the first basement and the second basement and containing streaky polymer and liquid crystal molecules, and
each of the first basement and the second basement is formed of resin.

17. The display device of claim 16, wherein
each of the first basement and the second basement is formed of amorphous resin.

* * * * *